US012327511B2

(12) United States Patent
Huang et al.

(10) Patent No.: US 12,327,511 B2
(45) Date of Patent: Jun. 10, 2025

(54) DRIVING METHOD OF DISPLAY PANEL AND DISPLAY APPARATUS

(71) Applicants: Hefei BOE Display Technology Co., Ltd., Anhui (CN); BOE Technology Group Co., Ltd., Beijing (CN)

(72) Inventors: Yanting Huang, Beijing (CN); Ke Dai, Beijing (CN); Chunyang Nie, Beijing (CN); Liugang Zhou, Beijing (CN); Yunlu Chen, Beijing (CN); Qing Li, Beijing (CN); Jun Wang, Beijing (CN); Zhi Meng, Beijing (CN); Wei Sun, Beijing (CN); Tianxun Xiu, Beijing (CN); Yue Yang, Beijing (CN)

(73) Assignees: Hefei BOE Display Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,326

(22) PCT Filed: May 16, 2022

(86) PCT No.: PCT/CN2022/093024
§ 371 (c)(1),
(2) Date: Mar. 14, 2023

(87) PCT Pub. No.: WO2023/220858
PCT Pub. Date: Nov. 23, 2023

(65) Prior Publication Data
US 2024/0304130 A1 Sep. 12, 2024

(51) Int. Cl.
*G09G 3/20* (2006.01)

(52) U.S. Cl.
CPC ... *G09G 3/2096* (2013.01); *G09G 2300/0413* (2013.01); *G09G 2300/0452* (2013.01);
(Continued)

(58) Field of Classification Search
CPC ......... G09G 3/2096; G09G 2300/0413; G09G 2300/0452; G09G 2310/0205;
(Continued)

(56) References Cited

U.S. PATENT DOCUMENTS

2003/0169247 A1* 9/2003 Kawabe ................. G09G 3/342 345/204
2006/0214927 A1 9/2006 Ikeda et al.
(Continued)

FOREIGN PATENT DOCUMENTS

CN 1825404 A 8/2006
CN 101496089 A 7/2009
(Continued)

*Primary Examiner* — Patrick N Edouard
*Assistant Examiner* — Eboni N Giles
(74) *Attorney, Agent, or Firm* — IPro, PLLC

(57) ABSTRACT

A driving method of a display panel and a display apparatus provided by embodiments of the present disclosure include: when a display mode switching startup instruction is received, a non-counting state is entered. The display panel is driven to display a first set picture, and a current display mode is switched to a target display mode. When a data mode switching completing instruction is received, a counting state is entered.

8 Claims, 8 Drawing Sheets

(52) U.S. Cl.
CPC ............... *G09G 2310/0205* (2013.01); *G09G 2310/0213* (2013.01); *G09G 2310/0221* (2013.01); *G09G 2310/0251* (2013.01); *G09G 2320/0613* (2013.01); *G09G 2320/10* (2013.01); *G09G 2330/021* (2013.01); *G09G 2340/0435* (2013.01)

(58) Field of Classification Search
CPC ... G09G 2310/0213; G09G 2310/0221; G09G 2310/0251; G09G 2320/0613; G09G 2320/10; G09G 2330/021; G09G 2340/0435
See application file for complete search history.

(56) References Cited

U.S. PATENT DOCUMENTS

| | | | | |
|---|---|---|---|---|
| 2009/0237391 | A1 | 9/2009 | Yanagi et al. | |
| 2013/0057763 | A1 | 3/2013 | Cha et al. | |
| 2014/0002431 | A1* | 1/2014 | Shibata ................ | G09G 3/3685 345/87 |
| 2019/0392744 | A1 | 12/2019 | Wang et al. | |
| 2020/0074916 | A1* | 3/2020 | Gu ....................... | G09G 3/2096 |
| 2022/0108658 | A1* | 4/2022 | Muto ..................... | H04N 23/65 |
| 2022/0189386 | A1* | 6/2022 | Yao .......................... | G09G 3/32 |

FOREIGN PATENT DOCUMENTS

| | | | |
|---|---|---|---|
| CN | 102982759 | A | 3/2013 |
| CN | 104123907 | A | 10/2014 |
| CN | 107507552 | A | 12/2017 |
| CN | 108831370 | A | 11/2018 |
| CN | 113593463 | A | 11/2021 |
| CN | 114267293 | * | 4/2022 |
| CN | 114267293 | A | 4/2022 |
| JP | H06202602 | A | 7/1994 |

* cited by examiner

DRIVING METHOD OF DISPLAY PANEL AND DISPLAY APPARATUS

CROSS-REFERENCE TO RELATED APPLICATIONS

This application is a National Stage of International Application No. PCT/CN2022/093024, filed May 16, 2022, the entire content of which is hereby incorporated by reference.

FIELD

The present disclosure relates to the technical field of display, in particular to a driving method of a display panel and a display apparatus.

BACKGROUND

A display panel, such as a liquid crystal display (LCD) panel and an organic light-emitting diode (OLED) display panel, generally includes a plurality of pixel units. Each pixel unit may include: a red sub-pixel, a green sub-pixel and a blue sub-pixel. By controlling brightness corresponding to each sub-pixel, a color required to be displayed is obtained through mixing to display a color image.

SUMMARY

A driving method of a display panel provided by embodiments of the present disclosure includes:

- entering into, when receiving a display mode switching startup instruction, a non-counting state, driving the display panel to display a first set picture, and switching a current display mode to a target display mode: and
- entering into a counting state when receiving a data mode switching completing instruction.

In some examples, after entering into the counting state, the method further includes:

- receiving display data;
- counting a first number of corresponding set targets in the display data: and
- driving the display panel to display a corresponding picture according to the received display data on the basis of the target display mode after determining that the first number is the same as a set number corresponding to the target display mode.

In some examples, after counting the first number of the corresponding set targets in the display data and before driving the display panel to display the corresponding picture according to the received display data on the basis of the target display mode after determining that the first number is the same as the set number corresponding to the target display mode, the method further includes:

- driving the display panel to display a second set picture in at least one display frame based on the target display mode when determining that the first number is the same as the set number.

In some examples, a quantity of the display frames for displaying the second set picture is determined by adopting a following formula: wherein $$SM=TM/AM.$$

SM represents the quantity of the display frames for displaying the second set picture, TM represents set time, and AM represents a reciprocal of a refresh frequency corresponding to the target display mode.

In some examples, at least one of the first set picture or the second set picture includes at least one of a pure-color picture or a gray-scale picture.

In some examples, the non-counting state includes one of a zero clearing state, a disabled state and a power-off state.

In some examples, the display panel includes a first display mode. The first display mode includes: in the first display frame of two adjacent display frames, gate lines in the display panel are driven row by row; and during driving of the gate lines connected with display sub-pixels at the next odd row after driving of the gate lines connected with display sub-pixels at the previous odd row; a data voltage corresponding to the display data is input to data lines corresponding to the display sub-pixels at the next odd row: and in the second display frame of the two adjacent display frames, the gate lines in the display panel are driven row by row, and during driving of the gate lines connected with display sub-pixels at the next even row after driving of the gate lines connected with display sub-pixels at the previous even row; a data voltage corresponding to the display data is input to data lines corresponding to the display sub-pixels at the next even row.

In some examples, the display panel includes a second display mode. The second display mode includes: in each display frame, the gate lines are driven row by row; and during driving of the next row of gate lines after driving of the previous row of gate lines, a data voltage corresponding to the display data is input to data lines corresponding to sub-pixels connected with the next row of gate lines.

In some examples, the display panel includes a third display mode. The third display mode includes: in each display frame, at least two adjacent rows of gate lines are grouped as one gate line group, display data corresponding to one row of sub-pixels in each gate line group is received, according to the received display data, the gate lines in the same gate line group are driven at the same time, the gate line groups are driven one by one, and during driving of the gate lines in the next gate line group after driving of the gate lines in the previous gate line group, a data voltage corresponding to the display data is input to data lines corresponding to sub-pixels connected with the gate lines of the next gate line group.

In some examples, the current display mode is one of the first display mode, the second display mode and the third display mode.

The target display mode is one of the first display mode, the second display mode and the third display mode other than the current display mode.

In some examples, the set targets include sub-pixel rows of the display panel.

The display panel includes display sub-pixel rows and dummy sub-pixel rows.

When the target display mode is the first display mode, the set number includes a total number of all the dummy sub-pixel rows and a half of a total number of the display sub-pixel rows.

When the target display mode is the second display mode, the set number includes the total number of all the dummy sub-pixel rows and the total number of all the display sub-pixel rows.

In some examples, the set targets include the gate line groups of the display panel.

When the target display mode is the third display mode, the set number includes a total number of the gate line groups.

A display apparatus provided by embodiments of the present disclosure includes:

a display panel: and a time schedule controller, configured to:

enter into, when receiving a display mode switching startup instruction, a non-counting state, drive the display panel to display a first set picture, and switch a current display mode to a target display mode: and enter into a counting state when receiving a data mode switching completing instruction.

In some examples, the display apparatus further includes: a system circuit, configured to:

send, when determining to switch different display modes, the display mode switching startup instruction to the time schedule controller, and switch a data sending mode corresponding to the current display mode to a data sending mode corresponding to the target display mode: and send the data mode switching completing instruction to the time schedule controller after completing switching from the data sending mode corresponding to the current display mode to the data sending mode corresponding to the target display mode.

In some examples, the display apparatus further includes: a counting unit.

The counting unit is configured to count a first number of corresponding set targets in the display data, and output a counting pass instruction when determining that the first number is the same as a set number corresponding to the target display mode.

The time schedule controller is further configured to control the counting unit to enter into the non-counting state when receiving the display mode switching startup instruction: and control the counting unit to enter into the counting state when receiving the data mode switching completing instruction.

In some examples, the counting unit is integrated in the time schedule controller.

DETAILED DESCRIPTION OF THE EMBODIMENTS

Figure 1:
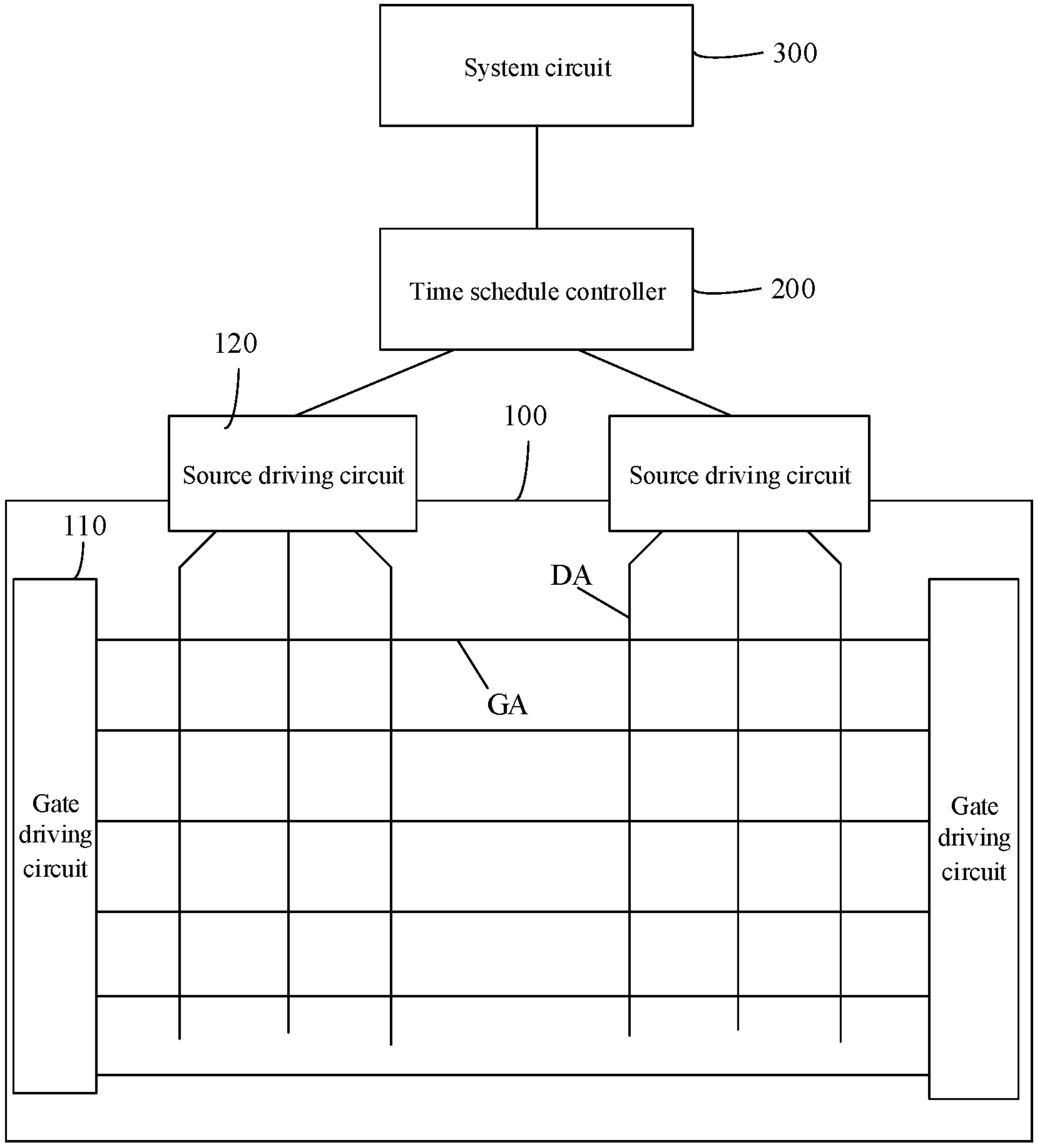
FIG. 1 is a schematic structural diagram of a display apparatus provided by some embodiments of the present disclosure.

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words "first", "second" and the like used in the present disclosure do not indicate any order, quantity or importance, but are only used to distinguish different components. The words "comprise" or "include" or the like indicate that an element or item appearing before such words covers listed elements or items appearing after the words and equivalents thereof, and do not exclude other elements or items. The words "connect" or "couple" or the like are not limited to physical or mechanical connections, but may include electrical connections, whether direct or indirect.

It should be noted that the sizes and shapes of all figures in the accompanying drawings do not reflect true scales, and are only intended to schematically illustrate the content of the present disclosure. The same or similar reference numerals represent the same or similar elements or elements with the same or similar functions throughout.

Figure 2:
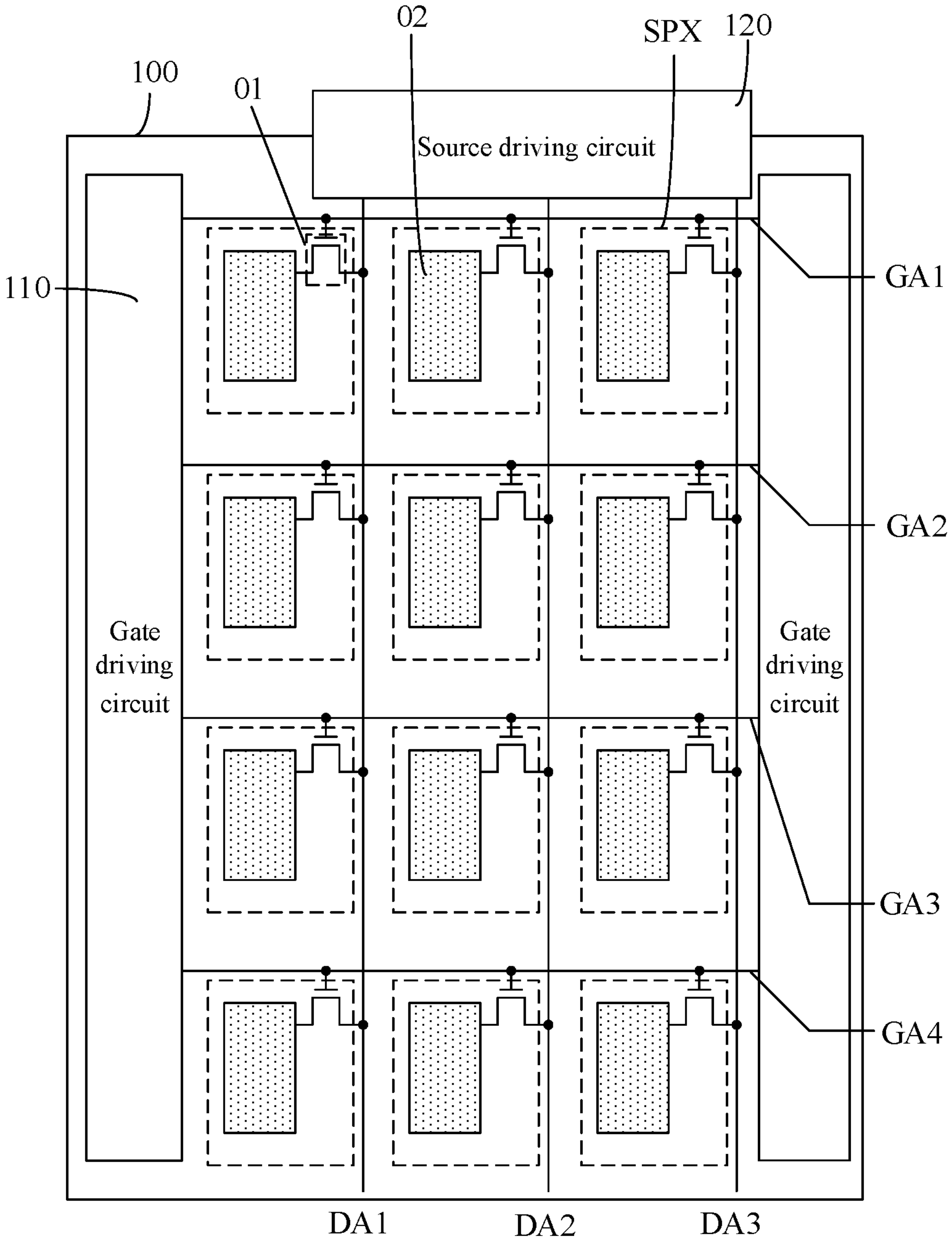
FIG. 2 is a schematic structural diagram of a display panel provided by some embodiments of the present disclosure.

Referring to FIG. 1 and FIG. 2, a display apparatus may include a display panel 100, a time schedule controller 200 and a system circuit 300. The display panel 100 may include a plurality of pixel units distributed in an array, a plurality of gate lines GA (e.g., GA1, GA2, GA3 and GA4), a plurality of data lines DA (e.g., DA1, DA2 and DA3), a gate driving circuit 110 and a source driving circuit 120. The gate driving circuit 110 is coupled with the gate lines GA1, GA2, GA3 and GA4, and the source driving circuit 120 is coupled with the data lines DA1. DA2 and DA3. Exemplarily, each pixel unit includes a plurality of sub-pixels SPX. For example, the pixel units may include red sub-pixels, green sub-pixels and blue sub-pixels, and therefore red, green and blue may be mixed to achieve color display. Alternatively, the pixel units may include red sub-pixels, green sub-pixels, blue sub-pixels and white sub-pixels, and therefore red, green, blue and white may be mixed to achieve color display. Alternatively, in practical applications, light emitting colors of the sub-pixels in the pixel units may be designed and determined according to practical application environments, which is not limited here.

Exemplarily, two source driving circuits 120 may be disposed. One of the source driving circuits 120 is connected with a half number of the data lines, and the other source driving circuit 120 is connected with the other half number of the data lines. Alternatively, three, four or more source driving circuits 120 may be disposed, which may be designed and determined according to the requirements of practical applications, and is not limited here.

Referring to FIG. 2, each sub-pixel SPX includes a transistor 01 and a pixel electrode 02. One row of sub-pixels SPX corresponds to one gate line, and one column of sub-pixels SPX corresponds to one data line. Gates of the transistors 01 are electrically connected with the corresponding gate lines, sources of the transistors 01 are electrically connected with the corresponding data lines, and drains of the transistors 01 are electrically connected with the corresponding pixel electrodes 02. It should be noted that the pixel array structure in the present disclosure may also be a double-gate structure. That is, two gate lines are disposed between every two adjacent rows of sub-pixels. A half of the data lines may be reduced in this distribution manner, that is, the data lines are contained between certain two adjacent columns of sub-pixels, and no data line is included between certain two adjacent columns of sub-pixels. Specific sub-pixel distribution structures and distribution manners of the data lines and scanning lines are not limited.

It should be noted that the display panel 100 in the embodiments of the present disclosure may be a liquid crystal display panel 100, an OLED display panel 100 and the like, which is not limited here.

Figure 3:
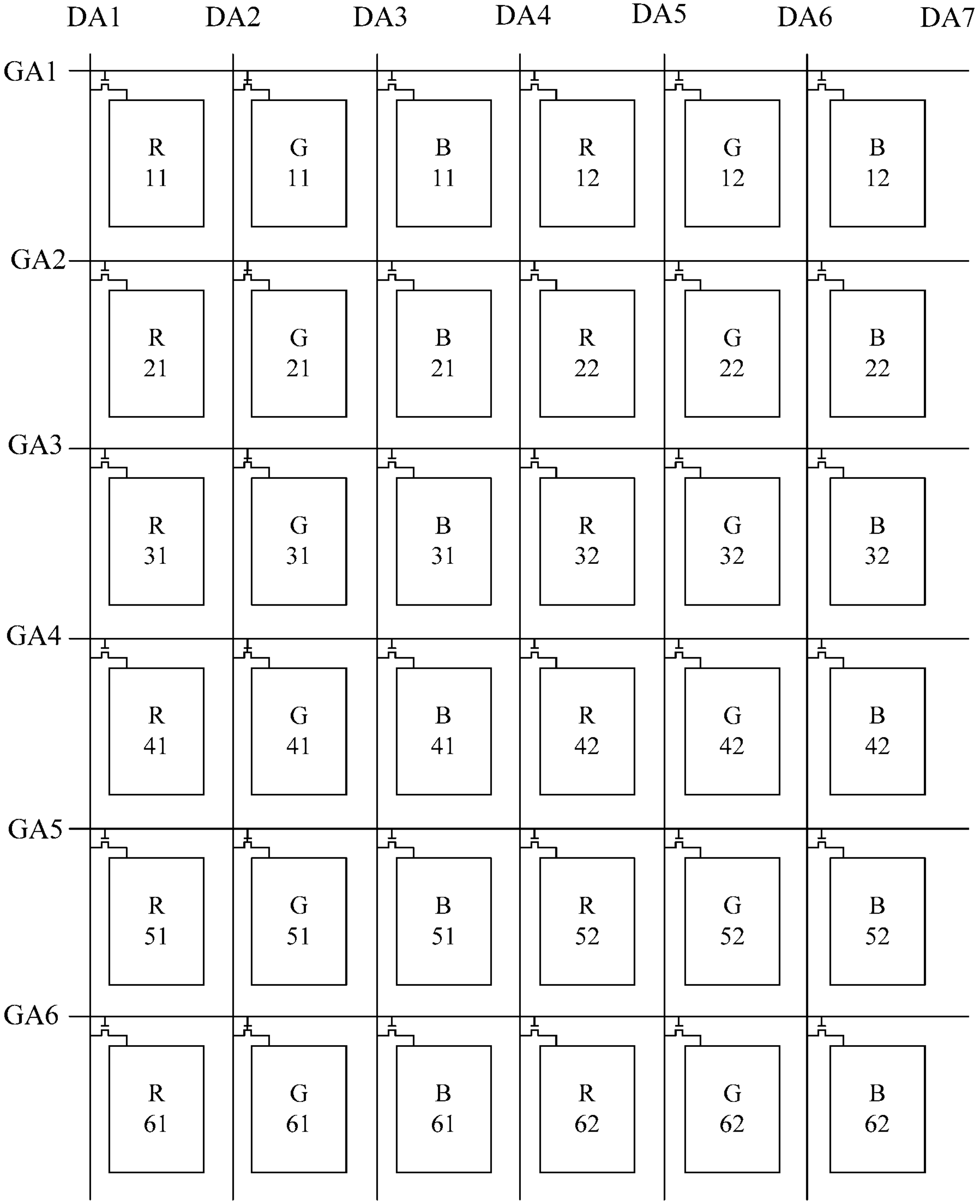
FIG. 3 is another schematic structural diagram of a display panel provided by some embodiments of the present disclosure.

In order to improve the picture display quality, dummy sub-pixels may be disposed in a non-display region in the display panel 100. Exemplarily, in embodiments of the present disclosure, the dummy sub-pixels are located at a peripheral region of display sub-pixels. That is, a region where the display sub-pixels are located is a display region, a region other than the display region on a base substrate may be the non-display region, the gate driving circuit 110 and the source driving circuit 120 may be disposed in the non-display region, and the dummy sub-pixels may be in a dummy region of the non-display region. For example, as shown in FIG. 3, the display sub-pixels R11-B62 are shown, and dummy sub-pixels may be disposed at the periphery of the display sub-pixels R11-B62. For example, the dummy sub-pixels may be disposed above the display sub-pixels R11-B12. Alternatively, the dummy sub-pixels may be disposed below the display sub-pixels R61-B62, which is not limited here. Optionally, the structure in the dummy sub-pixels may be approximately the same as the structure in the display sub-pixels. Alternatively, only the pixel electrodes may be disposed in the dummy sub-pixels, while no transistor is disposed therein. In practical applications, the quantity of the dummy sub-pixels may be set according to the requirements of the practical applications, which is not limited here.

Different display effects are required in different display application scenarios. For example, for a static picture, the power consumption needs to be lowered, and a high refresh frequency is not pursued. In a gaming mode, for smoother displaying, a high refresh frequency is pursued. The display panel 100 provided by the embodiments of the present disclosure may be applied to various different display modes. Exemplarily, in combination with FIG. 1 and FIG. 2, the system circuit 300 may obtain original display data of a picture to be displayed (the original display data includes a digital signal form of a data voltage, carrying a corresponding gray scale value, corresponding to each sub-pixel (including the display sub-pixel and the dummy sub-pixel) in the display panel 100 one to one), perform corresponding processing on the original display data to obtain display data corresponding to the current display mode, and send the obtained display data to the time schedule controller 200. The time schedule controller 200 inputs a corresponding control signal to the gate driving circuit 110 in the display panel 100 according to the obtained display data and the current display mode, controls the gate driving circuit 110 to drive the gate lines GA (e.g., GA1, GA2, GA3 and GA4) in the display panel 100, and controls the transistors in the sub-pixels to be turned on. The time schedule controller 200 sends the received display data to the source driving circuit, and the source driving circuit loads a data voltage to the data lines DA (e.g., DA1, DA2 and DA3) in the display panel 100 according to the received display data so as to charge the sub-pixels when the transistors in the sub-pixels are turned on, so that all the sub-pixels are charged with the data voltage to achieve a picture display function.

In the following, illustration is made by taking an example that the pixel units include red sub-pixels, green sub-pixels and blue sub-pixels. As shown in FIG. 3, the red sub-pixel R11, the green sub-pixel G11 and the blue sub-pixel B11 are one pixel unit, and the red sub-pixel R12, the green sub-pixel G12 and the blue sub-pixel B12 are one pixel unit. The red sub-pixel R21, the green sub-pixel G21 and the blue sub-pixel B21 are one pixel unit, and the red sub-pixel R22, the green sub-pixel G22 and the blue sub-pixel B22 are one pixel unit. The red sub-pixel R31, the green sub-pixel G31 and the blue sub-pixel B31 are one pixel unit, and the red sub-pixel R32, the green sub-pixel G32 and the blue sub-pixel B32 are one pixel unit. The red sub-pixel R41, the green sub-pixel G41 and the blue sub-pixel B41 are one pixel unit, and the red sub-pixel R42, the green sub-pixel G42 and the blue sub-pixel B42 are one pixel unit. The red sub-pixel R51, the green sub-pixel G51 and the blue sub-pixel B51 are one pixel unit, and the red sub-pixel R52, the green sub-pixel G52 and the blue sub-pixel B52 are one pixel unit. The red sub-pixel R61, the green sub-pixel G61 and the blue sub-pixel B61 are one pixel unit, and the red sub-pixel R62, the green sub-pixel G62 and the blue sub-pixel B62 are one pixel unit.

The display panel 100 in the embodiments of the present disclosure may include a plurality of different display modes. The display panel may be switched under any two display modes. In some examples, one of the plurality of display modes may be a second display mode. The second display mode may include: in each display frame, the system circuit 300 executes a data sending mode corresponding to the second display mode, i.e. the system circuit sends the received original display data (including a digital signal form of a data voltage, carrying a corresponding gray scale value, corresponding to each display sub-pixel and each dummy sub-pixel one to one) to the time schedule controller 200. The time schedule controller 200 according to the received display data controls the gate driving circuit to drive the gate lines row by row and sends the display data to the source driving circuit. According to the received display data, the source driving circuit inputs a data voltage corresponding to the display data to the data lines corresponding to the sub-pixels connected with the next row of gate lines during driving of the next row of gate lines after driving of the previous row of gate lines.

Figure 4:
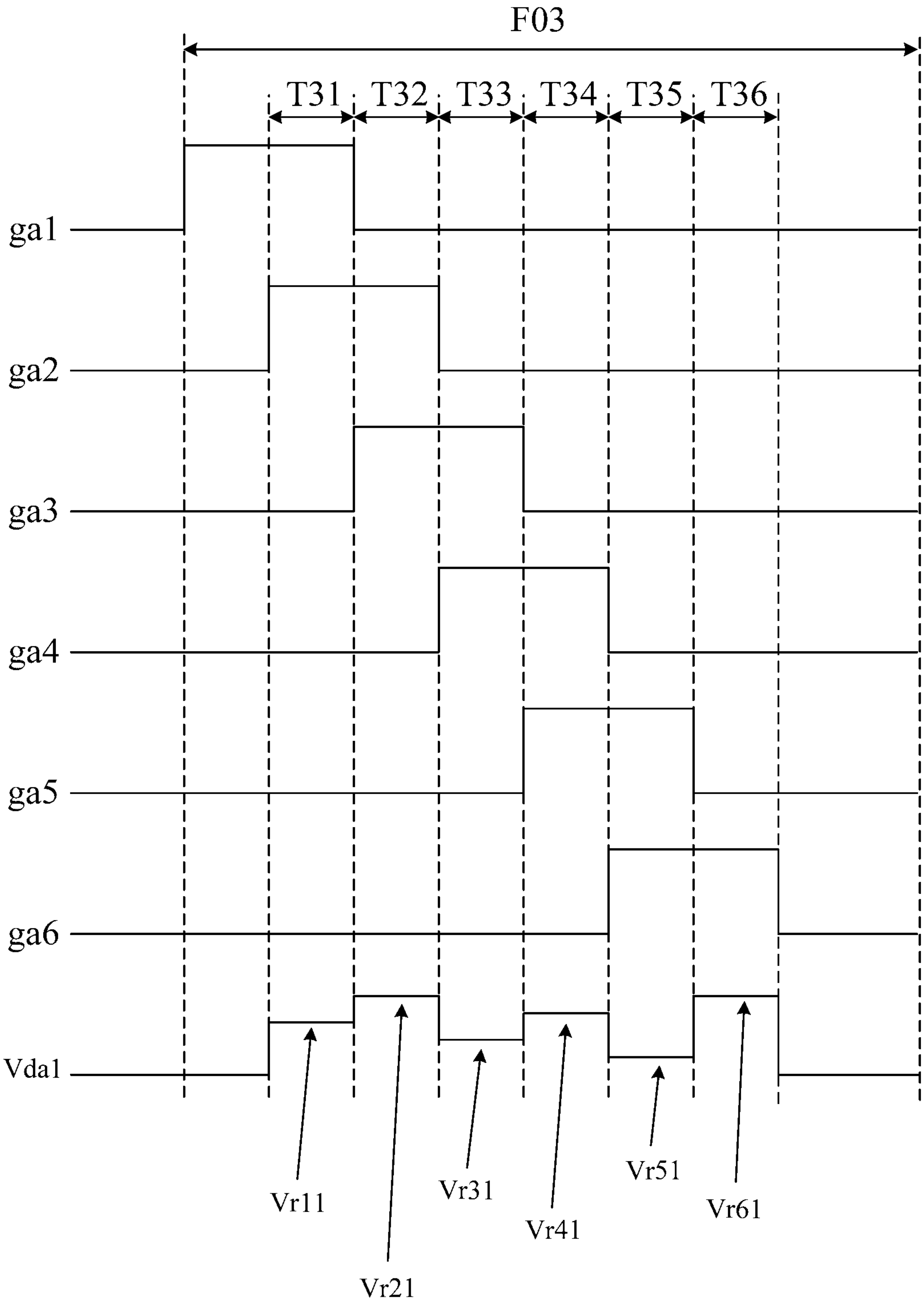
FIG. 4 is a signal sequence diagram provided by some embodiments of the present disclosure.

For example, in combination with FIG. 3 and FIG. 4, ga1 represents a signal loaded to the gate line GA1, ga2 represents a signal loaded to the gate line GA2, ga3 represents a signal loaded to the gate line GA3, ga4 represents a signal loaded to the gate line GA4, ga5 represents a signal loaded to the gate line GA5, and ga6 represents a signal loaded to the gate line GA6. Vda1 represents the data voltage loaded to the data line DA1. High levels in the signals ga1-ga6 may be used as gate turning-on signals to control the transistors in the sub-pixels to be turned on. When the display panel 100 is controlled to adopt the second display mode for driving, the gate turning-on signals may be loaded to the gate lines GA1-GA6 in sequence. Taking one display frame F03, the data line DA1 and the red sub-pixels connected with the data line DA1 as an example, when the signal ga1 on the gate line GA1 outputs the gate turning-on signal at the high level, the transistor in the red sub-pixel R11 is turned on. In a time period T31 corresponding to the high level of the signal ga1, the data voltage Vr11 corresponding to the display data is loaded to the data line DA1 connected with the red sub-pixel R11 so as to input the data voltage Vr11 to the red sub-pixel R11. In the time period T31, the signal ga2 on the gate line GA2 outputs the gate turning-on signal at the high level, and the transistor in the red sub-pixel R21 is turned on. The data voltage Vr11 is further input to the red sub-pixel R21 to pre-charge the red sub-pixel R21.

In a time period T32 corresponding to the high level of the signal ga2, the data voltage Vr21 corresponding to the display data is loaded to the data line DA1 connected with the red sub-pixel R21 so as to charge the red sub-pixel R21 with the data voltage Vr21. In the time period T32, the signal ga3 on the gate line GA3 outputs the gate turning-on signal at the high level, and the transistor in the red sub-pixel R31 is turned on. The data voltage Vr21 is further input to the red sub-pixel R31 to pre-charge the red sub-pixel R31.

In a time period T33 corresponding to the high level of the signal ga3, the data voltage Vr31 corresponding to the display data is loaded to the data line DA1 connected with the red sub-pixel R31 so as to charge the red sub-pixel R31 with the data voltage Vr31. In the time period T33, the signal ga4 on the gate line GA4 outputs the gate turning-on signal at the high level, and the transistor in the red sub-pixel R41 is turned on. The data voltage Vr31 is further input to the red sub-pixel R41 to pre-charge the red sub-pixel R41.

In a time period T34 corresponding to the high level of the signal ga4, the data voltage Vr41 corresponding to the display data is loaded to the data line DA1 connected with the red sub-pixel R41 so as to charge the red sub-pixel R41 with the data voltage Vr41. In the time period T34, the signal ga5 on the gate line GA5 outputs the gate turning-on signal at the high level, and the transistor in the red sub-pixel R51 is turned on. The data voltage Vr41 is further input to the red sub-pixel R51 to pre-charge the red sub-pixel R51.

In a time period T35 corresponding to the high level of the signal ga5, the data voltage Vr51 corresponding to the display data is loaded to the data line DA1 connected with the red sub-pixel R51 so as to charge the red sub-pixel R51 with the data voltage Vr51. In the time period T35, the signal ga6 on the gate line GA6 outputs the gate turning-on signal at the high level, and the transistor in the red sub-pixel R61 is turned on. The data voltage Vr51 is further input to the red sub-pixel R51 to pre-charge the red sub-pixel R51.

In a time period T36 corresponding to the high level of the signal ga6, the data voltage Vr61 corresponding to the display data is loaded to the data line DA1 connected with the red sub-pixel R61 so as to charge the red sub-pixel R61 with the data voltage Vr61. The next red sub-pixel is pre-charged.

The implementations of the remaining sub-pixels are analogized until the sub-pixels in the whole display panel 100 are charged with the data voltages, which is not repeated here.

It should be noted that, when the display panel 100 adopts the second display mode for driving, the working process of each display frame may be basically the same as the working process of the above display frame F03, which is not repeated here.

In some other examples, one of the plurality of display modes may be a first display mode. The first display mode includes: in the first display frame of two adjacent display frames, the system circuit 300 executes a data sending mode corresponding to the first display mode, i.e., the system circuit 300 obtains display data corresponding to odd rows of display sub-pixels after performing deleting processing on original display data corresponding to the display sub-pixels in the received original display data, and sends the obtained display data corresponding to the odd rows of display sub-pixels and display data corresponding to each dummy sub-pixel to the time schedule controller 200. It should be noted that, in embodiments of the present disclosure, optionally, the display panel includes the dummy sub-pixels, and data voltages are sent to the dummy sub-pixels. Optionally, the display panel may only include the display sub-pixels, which is not limited here. According to the received display data, the time schedule controller 200 sends a control signal corresponding to the first display mode to the gate driving circuit to control the gate driving circuit to drive the gate lines in the display panel 100 row by row, and sends the display data corresponding to the odd rows of display sub-pixels and the display data corresponding to each dummy sub-pixel to the source driving circuit. The source driving circuit, according to the received display data (e.g., the display data of the odd rows of display sub-pixels), inputs the data voltage corresponding to the display data to the data lines corresponding to the sub-pixels connected with the gate lines connected with the next dummy sub-pixel row during driving of the gate lines connected with the next dummy sub-pixel row after driving of the gate lines connected with the previous dummy sub-pixel row, and inputs the data voltage corresponding to the display data to the data lines corresponding to the next odd row of display sub-pixels during driving of the gate lines connected with the next odd row of display sub-pixels after driving of the gate lines connected with the previous odd row of display sub-pixels. In the second display frame of the two adjacent display frames, the system circuit 300 executes the data sending mode corresponding to the first display mode. i.e., the system circuit 300 obtains display data corresponding to even rows of display sub-pixels after performing deleting processing on original display data corresponding to the display sub-pixels in the received original display data, and sends the obtained display data corresponding to the even rows of display sub-pixels and display data corresponding to each dummy sub-pixel to the time schedule controller 200. According to the received display data, the time schedule controller 200 sends a control signal corresponding to the first display mode to the gate driving circuit to control the gate driving circuit to drive the gate lines in the display panel 100 row by row; and sends the display data corresponding to the even rows of display sub-pixels and the display data corresponding to each dummy sub-pixel to the source driving circuit. The source driving circuit, according to the received display data (e.g., the display data of the even rows of display sub-pixels), inputs the data voltage corresponding to the display data to the data lines corresponding to the sub-pixels connected with the gate lines connected with the next dummy sub-pixel row during driving of the gate lines connected with the next dummy sub-pixel row after driving of the gate lines connected with the previous dummy sub-pixel row, and inputs the data voltage corresponding to the display data to the data lines corresponding to the next even row of display sub-pixels during driving of the gate lines connected with the next even row of display sub-pixels after driving of the gate lines connected with the previous even row of display sub-pixels.

Figure 5:
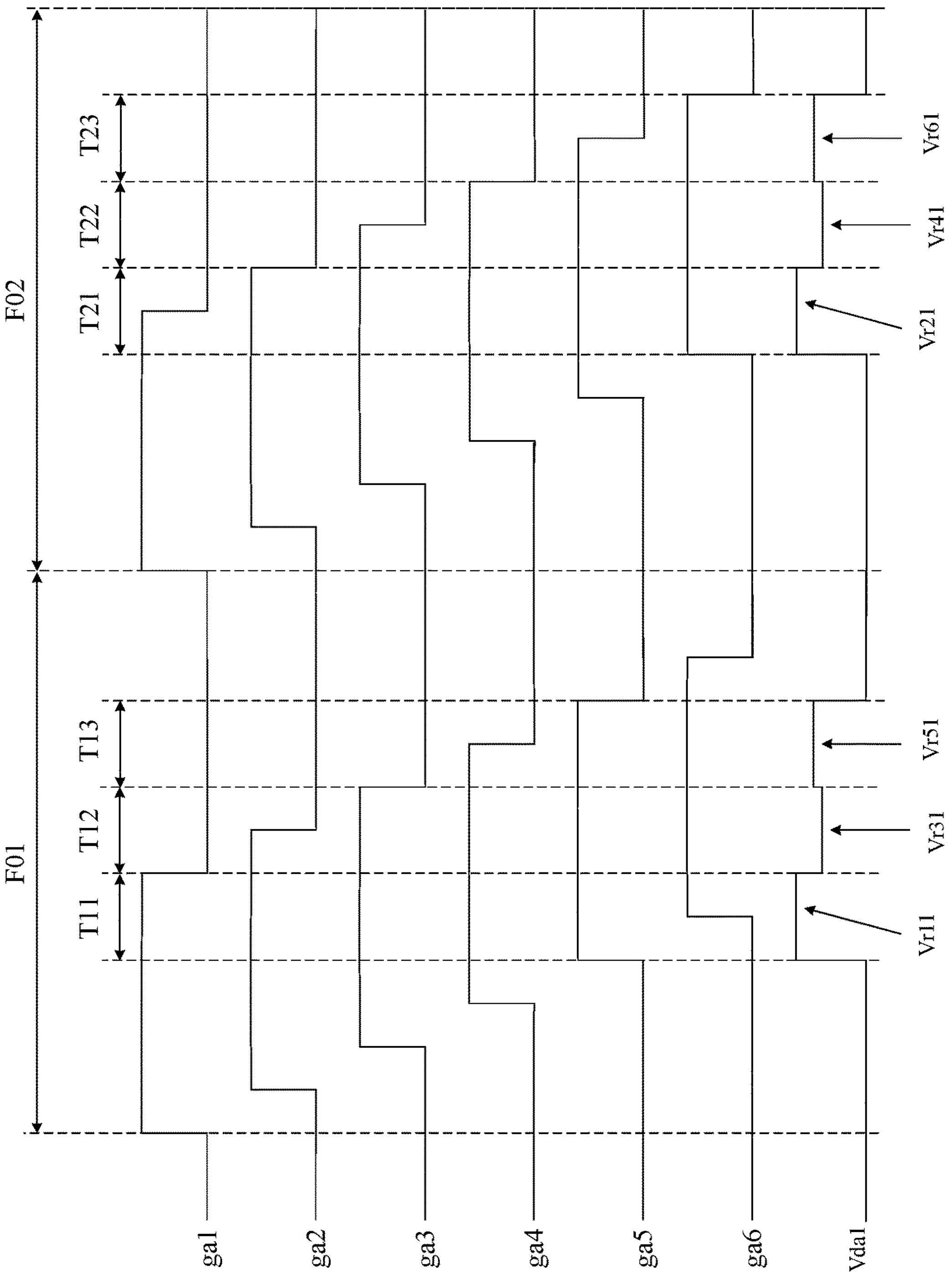
FIG. 5 is another signal sequence diagram provided by some embodiments of the present disclosure.

For example, in combination with FIG. 3 and FIG. 5, the working process of the display panel 100 adopting the first display mode for driving is illustrated, ga1 represents a signal loaded to the gate line GA1, ga2 represents a signal loaded to the gate line GA2, ga3 represents a signal loaded to the gate line GA3, ga4 represents a signal loaded to the gate line GA4, ga5 represents a signal loaded to the gate line GA5, and ga6 represents a signal loaded to the gate line GA6. Vda1 represents the data voltage loaded to the data line DA1. High levels in the signals ga1-ga6 may be used as gate turning-on signals to control the transistors in the sub-pixels to be turned on. When the display panel is controlled to adopt a first display mode for driving, the gate turning-on signals may be loaded to the gate lines GA1-GA6 in sequence. Two adjacent display frames F01 and F02, the data line DA1 and red sub-pixels connected with the data line DA1 are taken as an example.

In the display frame F01, when the signal ga1 on the gate line GA1 outputs the gate turning-on signal at the high level, the transistor in the red sub-pixel R11 is turned on. In a time period T11 corresponding to the high level of the signal ga1, the data voltage Vr11 corresponding to the display data of the red sub-pixel R11 is loaded to the data line DA1 connected with the red sub-pixel R11 so as to input the data voltage Vr11 to the red sub-pixel R11. In the time period T11, the signal ga2 on the gate line GA2 outputs the gate turning-on signal at the high level, and the transistor in the red sub-pixel R21 is turned on. The data voltage Vr11 is further input to the red sub-pixel R21 to pre-charge the red sub-pixel R21. In the time period T11, the signal ga3 on the gate line GA3 outputs the gate turning-on signal at the high level, and the transistor in the red sub-pixel R31 is turned on. The data voltage Vr11 is further input to the red sub-pixel R31 to pre-charge the red sub-pixel R31. In the time period T11, the signal ga4 on the gate line GA4 outputs the gate turning-on signal at the high level, and the transistor in the red sub-pixel R41 is turned on. The data voltage Vr11 is further input to the red sub-pixel R41 to pre-charge the red sub-pixel R41. In the time period T11, the signal ga5 on the gate line GA5 outputs the gate turning-on signal at the high level, and the transistor in the red sub-pixel R51 is turned on. The data voltage Vr11 is further input to the red sub-pixel R51 to pre-charge the red sub-pixel R51. In the time period T11, the signal ga6 on the gate line GA6 outputs the gate turning-on signal at the high level, and the transistor in the red sub-pixel R61 is turned on. The data voltage Vr11 is further input to the red sub-pixel R61 to pre-charge the red sub-pixel R61.

In a time period T12, the signal ga1 turns to be at a low level, and the signal ga3 is at a high level. The data voltage Vr31 corresponding to the display data of the red sub-pixel R31 is loaded to the data line DA1 connected with the red sub-pixel R31 so as to charge the red sub-pixel R31 with the data voltage Vr31. The signal ga2 is at a high level, and the data voltage Vr31 is further input to the red sub-pixel R21 to charge the red sub-pixel R21. The signal ga4 is at a high level, and the data voltage Vr31 is further input to the red sub-pixel R41 to pre-charge the red sub-pixel R41. The signal ga5 is at a high level, and the data voltage Vr31 is further input to the red sub-pixel R51 to pre-charge the red sub-pixel R51. The signal ga6 is at a high level, and the data voltage Vr31 is further input to the red sub-pixel R61 to pre-charge the red sub-pixel R61.

In a time period T13, the signal ga3 turns to be at a low level, and the signal ga5 is at a high level. The data voltage Vr51 corresponding to the display data of the red sub-pixel R51 is loaded to the data line DA1 connected with the red sub-pixel R51 so as to charge the red sub-pixel R51 with the data voltage Vr51. The signal ga4 is at a high level, and the data voltage Vr51 is further input to the red sub-pixel R41 to charge the red sub-pixel R41. The signal ga6 is at a high level, and the data voltage Vr51 is further input to the red sub-pixel R61 to pre-charge the red sub-pixel R61.

The implementations of the remaining sub-pixels are analogized until the sub-pixels in the whole display panel are charged with the data voltages, which is not repeated here.

In the display frame F02, when the signal ga2 on the gate line GA2 outputs the gate turning-on signal at the high level, the transistor in the red sub-pixel R21 is turned on. In a time period T21 corresponding to the high level of the signal ga2, the data voltage Vr21 corresponding to the display data of the red sub-pixel R21 is loaded to the data line DA1 connected with the red sub-pixel R21 so as to input the data voltage Vr21 to the red sub-pixel R21. In the time period T21, the signal ga1 on the gate line GA1 outputs the gate turning-on signal at the high level, and the transistor in the red sub-pixel R11 is turned on. The data voltage Vr21 is further input to the red sub-pixel R11 to charge the red sub-pixel R11. In the time period T21, the signal ga3 on the gate line GA3 outputs the gate turning-on signal at the high level, and the transistor in the red sub-pixel R31 is turned on. The data voltage Vr21 is further input to the red sub-pixel R31 to pre-charge the red sub-pixel R31. In the time period T21, the signal ga4 on the gate line GA4 outputs the gate turning-on signal at the high level, and the transistor in the red sub-pixel R41 is turned on. The data voltage Vr21 is further input to the red sub-pixel R41 to pre-charge the red sub-pixel R41. In the time period T21, the signal ga5 on the gate line GA5 outputs the gate turning-on signal at the high level, and the transistor in the red sub-pixel R51 is turned on. The data voltage Vr21 is further input to the red sub-pixel R51 to pre-charge the red sub-pixel R51. In the time period T21, the signal ga6 on the gate line GA6 outputs the gate turning-on signal at the high level, and the transistor in the red sub-pixel R61 is turned on. The data voltage Vr21 is further input to the red sub-pixel R61 to pre-charge the red sub-pixel R61.

In a time period T22, the signal ga2 turns to be at a low level, and the signal ga4 is at a high level. The data voltage Vr41 corresponding to the display data of the red sub-pixel R41 is loaded to the data line DA1 connected with the red sub-pixel R41 so as to charge the red sub-pixel R41 with the data voltage Vr41. The signal ga3 is at a high level, and the data voltage Vr41 is further input to the red sub-pixel R31 to charge the red sub-pixel R31. The signal ga5 is at a high level, and the data voltage Vr41 is further input to the red sub-pixel R51 to pre-charge the red sub-pixel R51. The signal ga6 is at a high level, and the data voltage Vr41 is further input to the red sub-pixel R61 to pre-charge the red sub-pixel R61.

In a time period T23, the signal ga4 turns to be at a low level, and the signal ga6 is at a high level. The data voltage Vr61 corresponding to the display data of the red sub-pixel R61 is loaded to the data line DA1 connected with the red sub-pixel R61 so as to charge the red sub-pixel R61 with the data voltage Vr61. The signal ga5 is at a high level, and the data voltage Vr61 is further input to the red sub-pixel R51 to charge the red sub-pixel R51. Other red sub-pixels are pre-charged.

The implementations of the remaining sub-pixels are analogized until the sub-pixels in the whole display panel are charged with the data voltages, which is not repeated here.

It should be noted that when the display panel 100 adopts the first display mode for driving, the working process of remaining display frames may be basically the same as the working process of the display frame F01 and the display frame F02 above, that is, the display panel 100 may adopt an HSR display mode for working, and thus the charging rate of the sub-pixels may be increased while the high refresh frequency is achieved.

It should be noted that, when the display panel 100 adopts the first display mode for driving, in the display frame F01, even rows of sub-pixels may be charged through the data voltage of adjacent odd rows of sub-pixels, so that a display function of the even rows of sub-pixels is achieved. For example, a voltage charging the red sub-pixel R21 may be related to the data voltage corresponding to the red sub-pixel R11 and the data voltage corresponding to the red sub-pixel R31 (may be approximately a mean value of the data voltage corresponding to the red sub-pixel R11 and the data voltage corresponding to the red sub-pixel R31), and a voltage charging the red sub-pixel R41 may be related to the data voltage corresponding to the red sub-pixel R31 and the data voltage corresponding to the red sub-pixel R51 (may be approximately a mean value of the data voltage corresponding to the red sub-pixel R31 and the data voltage corresponding to the red sub-pixel R51).

In the display frame F02, odd rows of sub-pixels may be charged through the data voltage of adjacent even rows of sub-pixels, so that a display function of the odd rows of sub-pixels is achieved. For example, a voltage charging the red sub-pixel R11 may be related to the data voltage corresponding to the red sub-pixel R21 (may be approximately the data voltage corresponding to the red sub-pixel R21), and a voltage charging the red sub-pixel R31 may be related to the data voltage corresponding to the red sub-pixel R21 and the data voltage corresponding to the red sub-pixel R41 (may be approximately a mean value of the data voltage corresponding to the red sub-pixel R21 and the data voltage corresponding to the red sub-pixel R41). A voltage charging the red sub-pixel R51 may be related to the data voltage corresponding to the red sub-pixel R41 and the data voltage corresponding to the red sub-pixel R61 (may be approximately a mean value of the data voltage corresponding to the red sub-pixel R41 and the data voltage corresponding to the red sub-pixel R61).

In some other examples, one of the plurality of display modes may be a third display mode. The third display mode includes: in each display frame, at least two adjacent rows of gate lines are one gate line group, and the system circuit 300 executes a data sending mode corresponding to the third display mode, i.e., the system circuit 300 obtains display data corresponding to sub-pixels electrically connected with one gate line in each corresponding gate line group after performing deleting processing on the received original display data and sends the obtained display data to the time schedule controller 200. According to the received display data, the time schedule controller 200 sends a control signal corresponding to the third display mode to the gate driving circuit so as to control the gate driving circuit to drive the gate lines in the same gate line group at the same time and drive the gate line groups one by one. The display data is also sent to the source driving circuit, so that, according to the received display data, the source driving circuit inputs a data voltage corresponding to the display data to the data lines corresponding to the sub-pixels connected with the gate lines of the next gate line group during driving of the gate lines in the next gate line group after driving of the gate lines in the previous gate line group. Exemplarily, two adjacent rows of gate lines may be used as one gate line group; or, three adjacent rows of gate lines may be used as one gate line group; or, four adjacent rows of gate lines may be used as one gate line group; or, more adjacent rows of gate lines may be used as one gate line group, which is not limited here.

Figure 6:
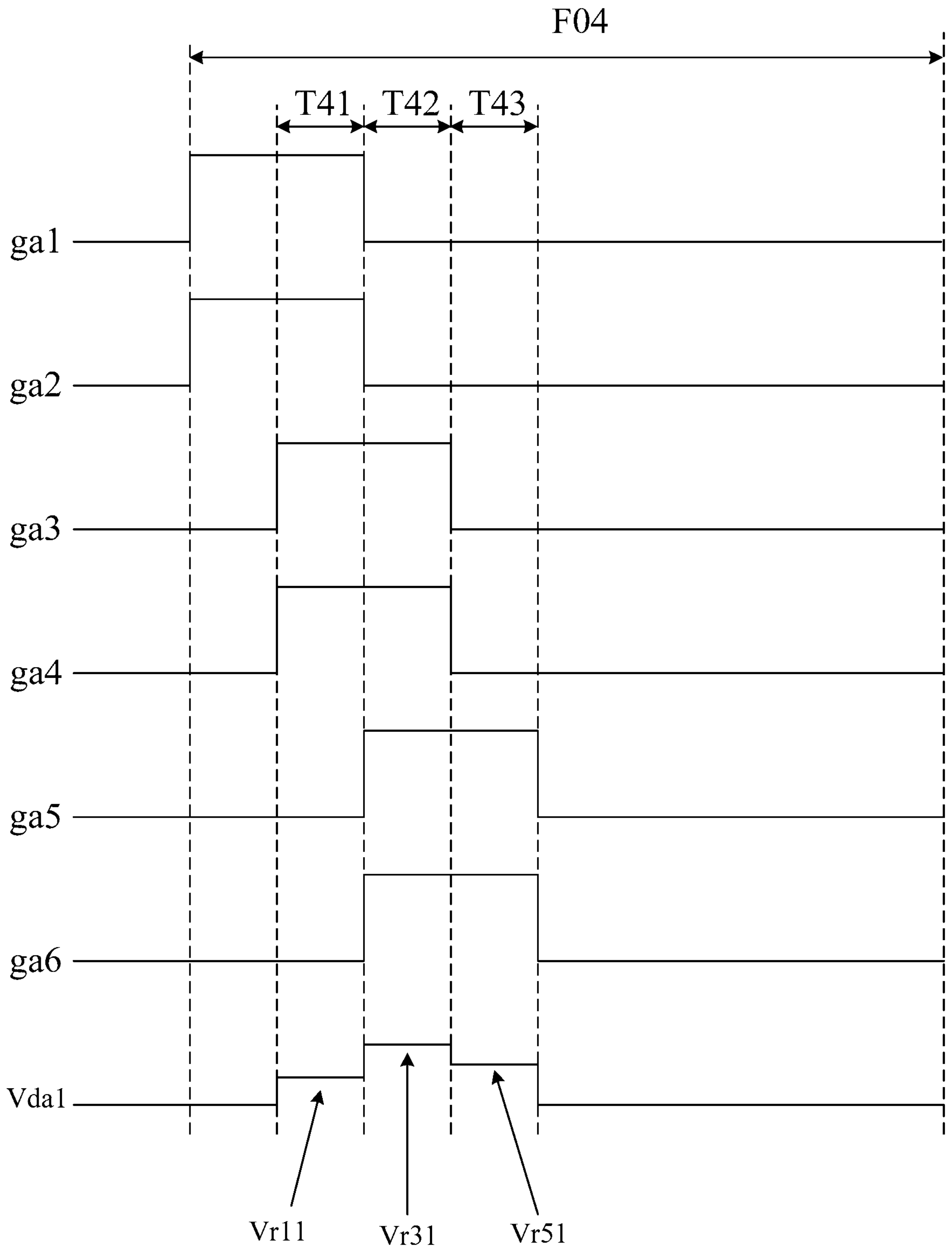
FIG. 6 is yet another signal sequence diagram provided by some embodiments of the present disclosure.

For example, in combination with FIG. 3 and FIG. 6, the working process of the display panel 100 adopting the third display mode for driving is illustrated. Two adjacent rows of gate lines are one gate line group. For example, the gate lines GA1 and GA2 are one gate line group, the gate lines GA3 and GA4 are one gate line group, and the gate lines GA5 and GA6 are one gate line group. After performing the deleting processing, the system circuit 300 obtains display data corresponding to each sub-pixel connected with the gate line GA1, display data corresponding to each sub-pixel connected with the gate line GA3 and display data corresponding to each sub-pixel connected with the gate line GA5, and sends the display data to the time schedule controller 200. Alternatively, after performing the deleting processing, the system circuit 300 may obtain display data corresponding to each sub-pixel connected with the gate line GA2, display data corresponding to each sub-pixel connected with the gate line GA4 and display data corresponding to each sub-pixel connected with the gate line GA6, and send the display data to the time schedule controller 200, which is not limited here.

Here, ga1 represents a signal loaded to the gate line GA1, ga2 represents a signal loaded to the gate line GA2, ga3 represents a signal loaded to the gate line GA3, ga4 represents a signal loaded to the gate line GA4, ga5 represents a signal loaded to the gate line GA5, and ga6 represents a signal loaded to the gate line GA6. Vda1 represents the data voltage loaded to the data line DA1. High levels in the signals ga1-ga6 may be used as gate turning-on signals to control the transistors in the sub-pixels to be turned on. When the display panel 100 is controlled to adopt the third display mode for driving, taking one display frame F04, the data line DA1 and the red sub-pixels connected with the data line DA1 as an example, the signal ga1 on the gate line GA1 and the signal ga2 on the gate line GA2 output the gate turning-on signal at the high level simultaneously, and the transistors in the red sub-pixels R11 and R21 are turned on simultaneously. In a time period T41 corresponding to the high levels of the signals ga1 and ga2, the data voltage Vr11 corresponding to the display data is input to the data line DA1 connected with the red sub-pixels R11 and R21 so as to charge the red sub-pixels R11 and R21 with the data voltage Vr11. In the time period T41, the signal ga3 on the gate line GA3 and the signal ga4 on the gate line GA4 both output the gate turning-on signal at the high level, and the transistors in the red sub-pixels R31 and R41 are both turned on. The data voltage Vr11 is further input to the red sub-pixels R31 and R41 to pre-charge the red sub-pixels R31 and R41.

In a time period T42 corresponding to the high levels of the signals ga3 and ga4, the data voltage Vr31 corresponding to the display data is loaded to the data line DA1 connected with the red sub-pixels R31 and R41 so as to charge the red sub-pixels R31 and R41 with the data voltage Vr31. In the time period T42, the signal ga5 on the gate line GA5 and the signal ga6 on the gate line GA6 both output the gate turning-on signal at the high level, and the transistors in the red sub-pixels R51 and R61 are both turned on. The data voltage Vr31 is further input to the red sub-pixels R51 and R61 to pre-charge the red sub-pixels R51 and R61.

In a time period T43 corresponding to the high levels of the signals ga5 and ga6, the data voltage Vr51 corresponding to the display data is loaded to the data line DA1 connected with the red sub-pixels R51 and R61 so as to charge the red sub-pixels R51 and R61 with the data voltage Vr51. The next red sub-pixel is pre-charged.

The implementations of the remaining sub-pixels are analogized until the sub-pixels in the whole display panel 100 are charged with the data voltages, which is not repeated here.

It should be noted that, when the display panel 100 adopts the third display mode for driving, the working process of each display frame may be basically the same as the working process of the above display frame F04, that is, the display panel 100 may adopt a DLG display mode for working, which is not repeated here.

In embodiments of the present disclosure, the refresh frequency of the second display mode may be less than the refresh frequency of the first display mode and the refresh frequency of the third display mode. Exemplarily, the refresh frequency of the display panel 100 may be 30 Hz, 48 Hz, 60 Hz, 90 Hz, 96 Hz, 120 Hz, 144 Hz, 240 Hz and the like. The refresh frequency of the first display mode, the refresh frequency of the second display mode and the refresh frequency of the third display mode may be selected from the above refresh frequencies supported by the display panel 100. For example, the refresh frequency of the second display mode may be 60 Hz, the refresh frequency of the first display mode may be 120 Hz, and the refresh frequency of the third display mode may be 120 Hz. In practical applications, the refresh frequency of the first display mode, the refresh frequency of the second display mode and the refresh frequency of the third display mode may be determined according to the requirements of the practical applications, which is not limited here.

In embodiments of the present disclosure, since the display panel includes the plurality of display modes, the display modes may be switched under different application scenarios. The discloser found that: when determining to switch the different display modes, the system circuit itself also starts a process of switching the data sending modes. For example, when determining to switch from the second display mode to the first display mode, the system circuit itself also starts a process of switching from the data sending mode corresponding to the second display mode to the data sending mode corresponding to the first display mode. Further, a mode switching signal is sent to the time schedule controller. After receiving the mode switching signal, the time schedule controller switches the second display mode to the first display mode. However, the system circuit may send the display data to the time schedule controller while switching the data sending modes. Since the switching speed of the data sending modes of the system circuit is less than the switching speed of the display modes of the time schedule controller, after the time schedule controller is switched from the second display mode to the first display mode, the system circuit generally has not completed switching, and the system circuit still adopts the data sending mode corresponding to the second display mode to send the original display data Vdata1 corresponding to all the sub-pixels to the time schedule controller. After the time schedule controller receives the original display data Vdata1, a counting unit will count a total number of sub-pixel rows corresponding to the original display data Vdata1 to obtain a counted number of the corresponding sub-pixel rows. However, since the time schedule controller has completed switching to the first display mode, a set number corresponding to the counting unit in the first display mode is different from the counted number obtained by counting the original display data Vdata1, resulting in that the counting unit cannot return to zero automatically, leading to lagging of the counting unit. The counting unit returns an abnormality instruction to the time schedule controller, and the time schedule controller enters into an early-warning mode in which the display panel is controlled to display an early-warning picture, resulting in abnormal displaying.

In order to solve the above problems, embodiments of the present disclosure provide a driving method of a display panel. When a display mode switching startup instruction is received, the display panel is driven to display a first set picture, and to switch a current display mode to a target display mode to achieve a mode switching process. When the display mode switching startup instruction is received, a non-counting state is entered, and a counting unit enters into a non-counting work state. By making the counting unit in the non-counting work state, even if a time schedule controller receives display data sent by a system circuit, the time schedule controller does not count any received display data. When a data mode switching completing instruction is received, the non-counting state is relieved, and the counting unit enters into a counting work state. By making the counting unit in the counting work state, any received display data can be counted. In this way, the system circuit starts counting work after completing mode switching, thereby avoiding the problem of lagging of the counting unit caused by the fact that the counting unit cannot return to zero automatically.

Figure 7:
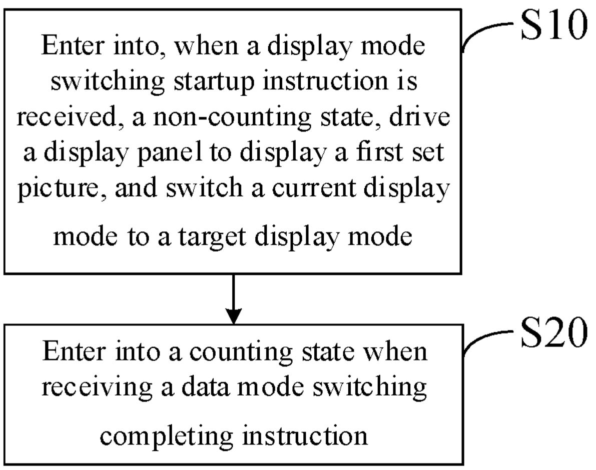
FIG. 7 is a flow diagram of a driving method provided by some embodiments of the present disclosure.

In combination with FIG. 7, a driving method of a display panel provided by embodiments of the present disclosure may include the following steps.

S10, when a display mode switching startup instruction is received, a non-counting state is entered, the display panel is driven to display a first set picture, and a current display mode is switched to a target display mode.

In the driving method provided by the embodiments of the present disclosure, different display modes may be switched according to practical application scenarios of the display panel. For example, a high refresh frequency is required for a gaming display picture, however, the high refresh frequency will shorten charging time of sub-pixels of the display panel, which results in insufficient charging of the sub-pixels. In the embodiments of the present disclosure, when a display mode with a low refresh frequency is switched to a display mode with a high refresh frequency, the charging rate of the sub-pixels may be increased while the high refresh frequency is achieved.

Exemplarily, a system circuit 300 determines to switch the different display modes according to application scenarios. For example, a current application scenario of the display panel 100 may be an ordinary video playing interface, and a second display mode is adopted for driving the display panel 100 to display a picture. When a user is to start a game, the system circuit 300 identifies that the next application scenario is a game interface which requires a high refresh frequency, the system circuit 300 may determine to switch the different display modes and send a display mode switching startup instruction to a time schedule controller 200. The time schedule controller 200 executes the process of step S10 when receiving the display mode switching startup instruction. When sending the display mode switching startup instruction, the system circuit 300 further switches a data sending mode corresponding to the current display mode to a data sending mode corresponding to the target display mode.

Figure 8:
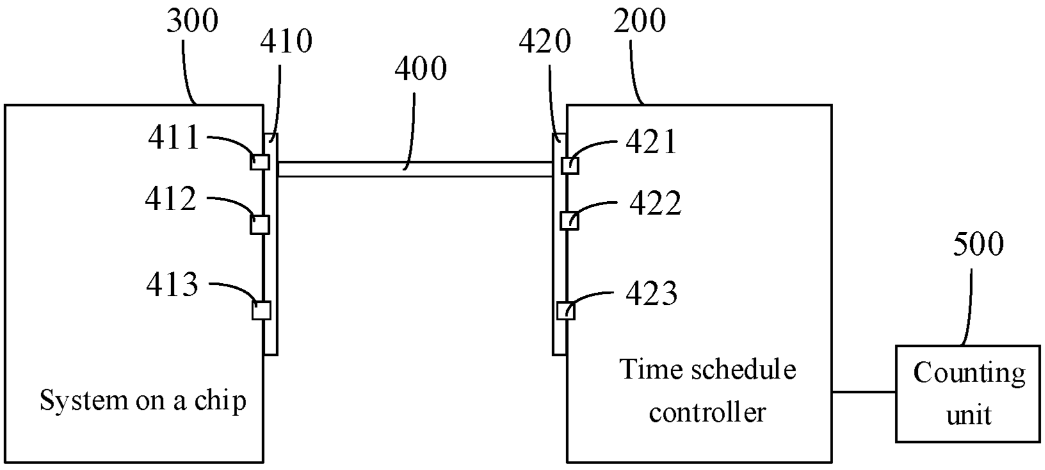
FIG. 8 is another schematic structural diagram of a display apparatus provided by some embodiments of the present disclosure.

Exemplarily, as shown in FIG. 8, the display apparatus may further include a connector 400. A first end 410 of the connector 400 is connected with the system circuit 300, and a second end 420 of the connector 400 is connected with the time schedule controller 200. The first end 410 of the connector 400 may include a first IIC pin 411 and a first switching instruction transmission pin 412, and the second end 420 of the connector 400 may include a second IIC pin 421 and a second switching instruction transmission pin 422. Exemplarily, the system circuit 300 outputs a handshake signal through the first IIC pin 410, the time schedule controller 200 receives the handshake signal through the second IIC pin 421 and shakes hand with the system circuit 300 after receiving the handshake signal. After handshake is completed, it illustrates that the system circuit 300 and the time schedule controller 200 are connected and may perform signal transmission. Exemplarily, the system circuit 300 may output the display mode switching startup instruction through the first switching instruction transmission pin 412 (e.g., pulling up a level of the first switching instruction transmission pin 412), and the time schedule controller 200 may receive the display mode switching startup instruction output by the system circuit 300 through the second switching instruction transmission pin 422 (e.g., since the level of the first switching instruction transmission pin 412 is pulled up, a level of the second switching instruction transmission pin 422 is also pulled up). When display mode switching is not needed and the system circuit 300 determines not to switch the display modes, the level of the first switching instruction transmission pin 412 is pulled down to output a display mode switching stop instruction, and the level of the second switching instruction transmission pin 422 is also pulled down to receive the display mode switching stop instruction, and the time schedule controller 200 does not switch the display modes. Alternatively, the system circuit 300 may output the display mode switching startup instruction in a digital signal form through the first IIC pin 411 (e.g., the display mode switching startup instruction has Byte0-Byte1. Exemplarily. Byte0 is 0×C2, Byte1 is 0×F26F, Byte2 is 0×01, and Byte3 is 0×AA), and the time schedule controller 200 receives the display mode switching startup instruction through the second IIC pin 421 and starts a process of switching the display modes according to the display mode switching startup instruction. When the system circuit 300 determines not to switch the display modes, the system circuit 300 may output the display mode switching stop instruction in a digital signal form through the first IIC pin 411 (e.g., the display mode switching stop instruction has Byte0-Byte1. Exemplarily, Byte0 is 0×C2, Byte1 is 0×F26F, Byte2 is 0×01, and Byte3 is 0×55), the time schedule controller 200 receives the display mode switching stop instruction through the second IIC pin 421, and the time schedule controller 200 does not switch the display modes.

In embodiments of the present disclosure, as shown in FIG. 8, the first end 410 of the connector 400 may further include a first data transmission pin 413; and the second end 420 of the connector 400 may further include a second data transmission pin 423. The system circuit 300 may output display data through the first data transmission pin 413. The time schedule controller 200 receives the display data through the second data transmission pin 423.

In embodiments of the present disclosure, as shown in FIG. 8, the display apparatus further includes: a counting unit 500. The counting unit 500 is configured to count a first number of corresponding set targets in the display data, and output a counting pass instruction when determining that the first number is the same as a set number corresponding to the target display mode. The time schedule controller 200 is configured to control the counting unit 500 to enter into the non-counting state when receiving the display mode switching startup instruction; and control the counting unit 500 to enter into the counting state when receiving the data mode switching completing instruction. Exemplarily, the counting unit 500 may be integrated in the time schedule controller 200 to increase the integration level and shorten a length of a data transmission line between the time schedule controller 200 and the counting unit 500. In some examples, the counting unit 500 may include but is not limited to a counter circuit.

Exemplarily, as shown in FIG. 8, when receiving the display mode switching startup instruction, the time schedule controller 200 controls the counting unit 500 to be in a zero clearing state, so that the counting unit 500 does not execute a counting operation and holds a zero clearing operation to enter into the non-counting state. Alternatively, when receiving the display mode switching startup instruction, the time schedule controller 200 controls the counting unit 500 to be in a disabled state; that is, the counting unit 500 is not enabled, so that the counting unit 500 does not execute a counting operation to enter into the non-counting state. Alternatively, when receiving the display mode switching startup instruction, the time schedule controller 200 does not supply power for the counting unit 500 and controls the counting unit 500 to be in a power-off state, so that the counting unit 500 does not execute a counting operation to enter into the non-counting state. Since the counting unit 500 does not execute the counting operation, even if the system circuit 300 sends the display data, set targets in the display data are not counted, and thus the problem of lagging may be avoided.

Exemplarily, a flash is disposed on a circuit board where the time schedule controller 200 is located, and display data (including a digital voltage form of a data voltage corresponding to each sub-pixel one to one) corresponding to the first set picture is stored in the flash. Exemplarily, when the time schedule controller 200 is switched from the second display mode to the first display mode, since the time schedule controller 200 starts to enter into the process of switching the different display modes when receiving the display mode switching startup instruction, before completing switching of the display modes, the time schedule controller 200 still drives the display panel 100 through the second display mode to display a picture. For example, when receiving the display mode switching startup instruction, the time schedule controller 200 obtains the pre-stored display data corresponding to the first set picture from the flash, and outputs the obtained display data corresponding to the first set picture to a source driving circuit 120. The source driving circuit 120 may receive the display data corresponding to the first set picture and load a corresponding data voltage to data lines according to the display data corresponding to the first set picture. The time schedule controller 200 inputs a control signal to a gate driving circuit, the gate driving circuit drives gate lines row by row, and a specific process refers to a driving process at the time of adopting the second display mode by the display panel 100, so that the display panel 100 is driven to display the first set picture. After switching of the display modes is completed, the time schedule controller 200 may drive the display panel 100 to display a picture according to the first display mode. For example, the time schedule controller 200 obtains the pre-stored display data corresponding to the first set picture from the flash, performs deleting processing on display data corresponding to display sub-pixels in the obtained display data corresponding to the first set picture, and then outputs display data corresponding to dummy sub-pixels and remaining display data corresponding to the display sub-pixels to the source driving circuit 120. The source driving circuit 120 may receive these display data and load a corresponding data voltage to the data lines according to these display data. The time schedule controller 200 inputs the control signal to the gate driving circuit, the gate driving circuit drives the gate lines row by row, and the specific process refers to the driving process at the time of adopting the first display mode by the display panel 100, so that the display panel 100 is driven to display the first set picture.

In some examples, the current display mode may be the second display mode, and the target display mode may be the first display mode. In this way, the display panel 100 may be switched from the second display mode to the first display mode which is used as an HSR display mode. For example, a high refresh frequency is required for a gaming display picture, so that when the display panel 100 is to display the gaming display picture, the first display mode as the HSR display mode may be adopted to increase the charging rate of the sub-pixels while achieving the high refresh frequency. For example, the second display mode corresponding to 120 Hz 4K 2K may be switched to the first display mode corresponding to 240 Hz 4K 1K.

In yet some examples, the current display mode may be the second display mode, and the target display mode may be a third display mode. In this way, the display panel 100 may be switched from the second display mode to the third display mode which is used as a DLG display mode. For example, a high refresh frequency is required for a gaming display picture, so that when the display panel 100 is to display the gaming display picture, the third display mode as the DLG display mode may be adopted to increase the charging rate of the sub-pixels while achieving the high refresh frequency.

In yet some examples, the current display mode may be the third display mode, and the target display mode may be the first display mode. In this way, the display panel 100 may be switched from the third display mode as the DLG display mode to the first display mode as the HSR display mode. Since the resolution of a picture displayed by the display panel 100 under the third display mode as the DLG display mode is lowered, although the resolution of a picture displayed by the display panel 100 under the first display mode as the HSR display mode is also lowered, voltages input to two adjacent rows of sub-pixels in the same column are not completely the same when the display panel 100 is under the first display mode as the HSR display mode, the picture displayed by the display panel 100 under the first display mode as the HSR display mode is finer, and thus the first display mode as the HSR display mode may be adopted to further improve the picture display quality when the display panel 100 is to display the gaming display picture.

In yet some examples, the current display mode may be the first display mode, and the target display mode may be the third display mode. In this way, the display panel 100 may be switched from the first display mode as the HSR display mode to the third display mode as the DLG display mode. In this way, when the display panel 100 is to display the gaming display picture, the third display mode as the DLG display mode may be adopted to further increase the charging rate of the sub-pixels.

In yet some examples, the current display mode may be the third display mode, and the target display mode may be the second display mode. In this way, the display panel 100 may be switched from the third display mode as the DLG display mode to the second display mode. For example, a high refresh frequency is not required for a static display picture, but low power consumption is required, so that when the display panel 100 is to display the static display picture, the second display mode as an ordinary display mode may be adopted to lower the power consumption.

In yet some examples, the current display mode may be the first display mode, and the target display mode may be the second display mode. In this way, the display panel 100 may be switched from the first display mode as the HSR display mode to the second display mode. For example, a high refresh frequency is not required for the static display picture, but low power consumption is required, so that when the display panel 100 is to display the static display picture, the second display mode as the ordinary display mode may be adopted to lower the power consumption. For example, the first display mode corresponding to 240 Hz 4K 1K may be switched to the second display mode corresponding to 120 Hz 4K 2K.

A gray scale is generally that brightness change between the darkest and the brightest is divided into a plurality of parts to facilitate screen brightness control. For example, displayed images are composed of red, green and blue, each color may present different brightness levels, and red, green and blue of different brightness levels may be combined to form different colors. For example, the gray scale bits of the liquid crystal display panel 100 are 6 bits, the three colors, red, green and blue, each have 64 (i.e. $2^6$) gray scales, and values of these 64 gray scales are 0-63 respectively. The gray scale bits of the liquid crystal display panel 100 are 8 bits, the three colors, red, green and blue, each have 256 (i.e. $2^8$) gray scales, and values of these 256 gray scales are 0-255 respectively. The gray scale bits of the liquid crystal display panel 100 are 10 bits, the three colors, red, green and blue, each have 1024 (i.e. $2^{10}$) gray scales, and values of these 1024 gray scales are 0-1023 respectively. The gray scale bits of the liquid crystal display panel 100 are 12 bits, the three colors, red, green and blue, each have 4096 (i.e. $2^{12}$) gray scales, and values of these 4096 gray scales are 0-4095 respectively.

In embodiments of the present disclosure, the first set picture may include a pure-color picture. For example, the first set picture may include a red pure-color picture, a green pure-color picture and a blue pure-color picture. For example, taking an example that the display panel 100 has the gray scale values of 0-255, when the display panel 100 displays the red pure-color picture, a data voltage of display data corresponding to the same gray scale value (e.g., the gray scale value of 127, the gray scale value of 255, etc.) is input to red sub-pixels in the display panel 100, and a data voltage of display data corresponding to the gray scale value of 0 is input to green sub-pixels and blue sub-pixels. When the display panel 100 displays the green pure-color picture, a data voltage of display data corresponding to the same gray scale value (e.g., the gray scale value of 127, the gray scale value of 255, etc.) is input to the green sub-pixels in the display panel 100, and a data voltage of display data corresponding to the gray scale value of 0 is input to the red sub-pixels and the blue sub-pixels. When the display panel 100 displays the blue pure-color picture, a data voltage of display data corresponding to the same gray scale value (e.g., the gray scale value of 127, the gray scale value of 255, etc.) is input to the blue sub-pixels in the display panel 100, and a data voltage of display data corresponding to the gray scale value of 0 is input to the green sub-pixels and the red sub-pixels.

In embodiments of the present disclosure, the first set picture may also include a gray-scale picture. The gray-scale picture may be a picture in which sub-pixels of various colors have the same gray scale value. For example, taking an example that the display panel 100 has the gray scale values of 0-255, the picture is a picture in which the sub-pixels of various colors all have a gray scale value of 0 (i.e., a black picture). Alternatively, the picture is a picture in which the sub-pixels of various colors all have a gray scale value of 127. Alternatively, the picture is a picture in which the sub-pixels of various colors all have a gray scale value of 100. Alternatively, the picture is a picture in which the sub-pixels of various colors all have a gray scale value of 200. Alternatively, the picture is a picture in which the sub-pixels of various colors all have a gray scale value of 255.

S20, a counting state is entered when a data mode switching completing instruction is received.

In embodiments of the present disclosure, the system circuit 300 may send the data mode switching completing instruction to the time schedule controller 200 after completing switching from the data sending mode corresponding to the current display mode to the data sending mode corresponding to the target display mode. Since the switching speed of the system circuit 300 is less than the switching speed of the time schedule controller 200, after switching of the system circuit 300 is completed, the time schedule controller 200 has completed switching. When the system circuit 300 sends the data mode switching completing instruction to the time schedule controller 200, the time schedule controller 200 may determine that the system circuit 300 has completed switching, and control the counting unit 500 to enter into the counting state when receiving the data mode switching completing instruction. Exemplarily, the time schedule controller 200 may enable the counter circuit in the counting unit 500 to make the counter circuit execute the counting operation. Exemplarily, the system circuit 300 may output the data mode switching completing instruction in a digital signal form through the first IIC pin 411 (e.g., the data mode switching completing instruction has Byte0-Byte1. Exemplarily, Byte0 is 0×C2, Byte1 is 0×F26F, Byte2 is 0×01, and Byte3 is 0×66), and the time schedule controller 200 receives the data mode switching completing instruction through the second IIC pin 421 and controls the counter circuit to start to execute the function of the counting operation according to the data mode switching completing instruction.

In embodiments of the present disclosure, after entering into the counting state, the method may further include: receiving display data; counting a first number of corresponding set targets in the display data; and driving the display panel 100 to display a corresponding picture according to the received display data on the basis of the target display mode after determining that the first number is the same as a set number corresponding to the target display mode. Exemplarily, the system circuit 300 may adopt the data sending mode corresponding to the target display mode, process the received original display data into the display data corresponding to the target display mode, and output the processed display data to the time schedule controller 200. After receiving the display data, the time schedule controller 200 controls the counting unit 500 to count the corresponding set targets in the display data to obtain the first number through counting. When determining that the counted first number is the same as the set number corresponding to the target display mode, the counting unit 500 may return to zero automatically and feed a pass instruction back to the time schedule controller 200. When receiving the pass instruction, the time schedule controller 200 may determine that the display data output by the system circuit 300 corresponds to display data required by the target display mode, so that the time schedule controller 200 may drive the display panel 100 to display the corresponding picture according to the received display data on the basis of the target display mode.

In embodiments of the present disclosure, the display panel 100 includes a plurality of sub-pixel rows. The sub-pixel rows may have display sub-pixel rows (the first row of sub-pixels to the sixth row of sub-pixels as shown in FIG. 3) and dummy sub-pixel rows. The set targets may include the sub-pixel rows of the display panel 100. When the target display mode is the first display mode, the set number may include a total number of all the dummy sub-pixel rows and a half of a total number of the display sub-pixel rows. Exemplarily, the counting unit 500 may count the quantity of corresponding sub-pixel rows in the display data received by the time schedule controller 200 to obtain the total number of these sub-pixel rows through counting as the first number. After the time schedule controller 200 is switched to the first display mode, the set number may be the total number of all the dummy sub-pixel rows and a half of the total number of the display sub-pixel rows.

In embodiments of the present disclosure, the display panel 100 includes a plurality of sub-pixel rows. The sub-pixel rows may have display sub-pixel rows (the first row of sub-pixels to the sixth row of sub-pixels as shown in FIG. 3) and dummy sub-pixel rows. The set targets may include the sub-pixel rows of the display panel 100. When the target display mode is the second display mode, the set number may include a total number of all the dummy sub-pixel rows and a total number of all the display sub-pixel rows. Exemplarily, the counting unit 500 may count the quantity of corresponding sub-pixel rows in the display data received by the time schedule controller 200 to obtain the total number of these sub-pixel rows through counting as the first number. After the time schedule controller 200 is switched to the second display mode, the set number may be the total number of all the dummy sub-pixel rows and the total number of all the display sub-pixel rows. For example, when the second display mode is switched to the first display mode, if the display data in the second display mode is 4K2K display data, then the set number corresponding to the second display mode may be 2177 (including 2160 display sub-pixel rows and 17 dummy sub-pixel rows), and the set number corresponding to the first display mode may be 1097 (including 1080 display sub-pixel rows (i.e., a half of the total number of the display sub-pixel rows) and 17 dummy sub-pixel rows).

In embodiments of the present disclosure, the display panel 100 includes a plurality of sub-pixel rows. The sub-pixel rows may have display sub-pixel rows (the first row of sub-pixels to the sixth row of sub-pixels as shown in FIG. 3) and dummy sub-pixel rows. In the third display mode, the plurality of sub-pixel rows are divided into a plurality of gate line groups, and the set targets may include the gate line groups of the display panel 100. When the target display mode is the third display mode, the set number includes a total number of the gate line groups. Exemplarily, the counting unit 500 may count the quantity of the corresponding gate line groups in the display data received by the time schedule controller 200 to obtain the total number of these gate line groups through counting as the first number. After the time schedule controller 200 is switched to the third display mode, the set number may be the total number of all the gate line groups.

During implementations, when receiving the pass instruction, the time schedule controller 200 may directly drive the display panel 100 to display the corresponding picture according to the received display data on the basis of the target display mode. Further, since the situation of an instable function may occur after switching of the system circuit 300, in order to further improve the displaying stability, after the first number of the corresponding set targets in the display data is counted, when it is determined that the first number is the same as the set number, the display panel 100 is driven to display a second set picture in at least one display frame based on the target display mode, and then the display panel 100 is driven to display the corresponding picture according to the received display data on the basis of the target display mode. For example, the system circuit 300 may adopt the data sending mode corresponding to the target display mode, process the received original display data into the display data corresponding to the target display mode, and output the processed display data to the time schedule controller 200. After receiving the display data, the time schedule controller 200) controls the counting unit 500 to count the corresponding set targets in the display data to obtain the first number through counting. When determining that the counted first number is the same as the set number corresponding to the target display mode, the counting unit 500 may feed a pass instruction back to the time schedule controller 200. When receiving the pass instruction, the time schedule controller 200 may drive the display panel 100 to display the second set picture in one or more display frames based on the target display mode. Afterwards, the display panel 100 is driven to display the corresponding picture according to the received display data on the basis of the target display mode.

In embodiments of the present disclosure, the quantity of the display frames for displaying the second set picture is determined by adopting a formula SM=TM/AM. SM represents the quantity of the display frames for displaying the second set picture. TM represents set time, and AM represents a reciprocal of a refresh frequency corresponding to the target display mode. Exemplarily, the set time may be determined according to time consumed for switching of the system circuit 300, so as to improve the stability. Alternatively, the set time may be determined according to a time interval between receiving of the display mode switching startup instruction and receiving of the data mode switching completing instruction by the time schedule controller 200, so as to further improve the stability.

Exemplarily, when the set time is determined according to the time consumed for switching of the system circuit 300, and if the time consumed for switching of the system circuit 300 is approximately 83 ms, a refresh frequency corresponding to the target display mode is 240 Hz, and the time of one display frame is approximately 4.16 ms at 240 Hz, then the quantity SM of the display frames for displaying the second set picture may be 20. If the time consumed for switching of the system circuit 300 is 83 ms, a refresh frequency corresponding to the target display mode is 120 Hz, and the time of one display frame is approximately 8.33 ms at 120 Hz, then the quantity SM of the display frames for displaying the second set picture may be 10.

In embodiments of the present disclosure, the second set picture may include a pure-color picture. For example, the second set picture may include a red pure-color picture, a green pure-color picture and a blue pure-color picture. For example, taking an example that the display panel 100 has the gray scale values of 0-255, when the display panel 100 displays the red pure-color picture, a data voltage of display data corresponding to the same gray scale value (e.g., the gray scale value of 127, the gray scale value of 255, etc.) is input to red sub-pixels in the display panel 100, and a data voltage of display data corresponding to the gray scale value of 0) is input to green sub-pixels and blue sub-pixels. When the display panel 100 displays the green pure-color picture, a data voltage of display data corresponding to the same gray scale value (e.g., the gray scale value of 127, the gray scale value of 255, etc.) is input to the green sub-pixels in the display panel 100, and a data voltage of display data corresponding to the gray scale value of 0 is input to the red sub-pixels and the blue sub-pixels. When the display panel 100 displays the blue pure-color picture, a data voltage of display data corresponding to the same gray scale value (e.g., the gray scale value of 127, the gray scale value of 255, etc.) is input to the blue sub-pixels in the display panel 100, and a data voltage of display data corresponding to the gray scale value of 0 is input to the green sub-pixels and the red sub-pixels.

In embodiments of the present disclosure, the second set picture may also include a gray-scale picture. The gray-scale picture may be a picture in which sub-pixels of various colors have the same gray scale value. For example, taking an example that the display panel 100 has the gray scale values of 0-255, the picture is a picture in which the sub-pixels of various colors all have a gray scale value of 0 (i.e., a black picture). Alternatively, the picture is a picture in which the sub-pixels of various colors all have a gray scale value of 127. Alternatively, the picture is a picture in which the sub-pixels of various colors all have a gray scale value of 100. Alternatively: the picture is a picture in which the sub-pixels of various colors all have a gray scale value of 200. Alternatively, the picture is a picture in which the sub-pixels of various colors all have a gray scale value of 255.

In embodiments of the present disclosure, display data of the second set picture may also be stored in the flash. Exemplarily, the first set picture and the second set picture may be the same. In this way, only the display data of the first set picture or the display data of the second set picture may be stored in the flash, so that storage space required for storage is reduced. Alternatively, in practical applications, the first set picture and the second set picture may be different, which is not limited here.

In embodiments of the present disclosure, the system circuit 300 may include a system on a chip (SOC). Alternatively, the system circuit 300 may adopt other implementable manners, which is not limited here.

Figure 9:
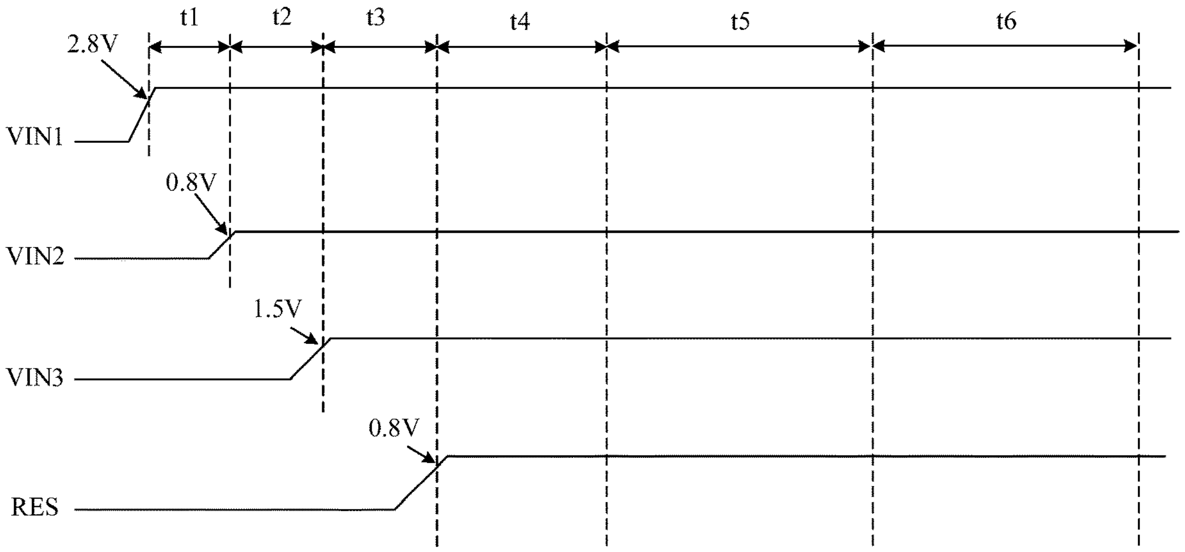
FIG. 9 is yet another signal sequence diagram provided by some embodiments of the present disclosure.

The above driving method provided by the embodiments of the present disclosure will be described below in combination with FIG. 8 and FIG. 9.

When the display apparatus is started, the system circuit 300 is powered. The system circuit 300 provides a power supply voltage VIN1, such as 3.3 V, to the time schedule controller 200 through a first power supply pin of the connector 400, and the first power supply pin is pulled up from 0 V to 3.3 V. The system circuit 300 provides a power supply voltage VIN2, such as 1.1 V, to the time schedule controller 200 through a second power supply pin of the connector 400, and the second power supply pin is pulled up from 0 V to 1.1 V. The system circuit 300 provides a power supply voltage VIN3, such as 1.8 V, to the time schedule controller 200 through a third power supply pin of the connector 400, and the third power supply pin is pulled up from 0 V to 1.8 V. The system circuit 300 provides an initialization voltage RES, such as 1.15 V, to the time schedule controller 200 through an initialization pin of the connector 400, and the initialization pin is pulled up from 0 V to 1.15 V, t1 represents delay time from pulling up the first power supply pin from 0 V to 2.8 V to pulling up the second power supply pin from 0 V to 0.8 V, t2 represents delay time from pulling up the second power supply pin from 0 V to 0.8 V to pulling up the third power supply pin from 0 V to 1.5 V, and t3 represents delay time from pulling up the third power supply pin from 0 V to 1.5 V to pulling up the initialization pin from 0 V to 0.8 V. The time schedule controller 200 may start a function to be executed after the power supply voltages VIN1-VIN3 are stable. After the initialization voltage is pulled up to 1.15 V, it enters into a stage t4, and the time schedule controller 200 executes an initialization operation to determine the current display mode as the second display mode. That is, when powered again, the time schedule controller 200 executes an operation in the second display mode by default. Afterwards, it enters into a stage t5, the system circuit has not determined to switch the display mode, and thus the second display mode continues to be adopted to drive the display panel 100 to display a picture with 4K2K data. Afterwards, it enters into a stage t6, the system circuit determines to perform a switching process of switching the second display mode (e.g., 4K2K display data) to the first display mode (e.g., 4K1K display data). The system circuit 300 pulls up the level of the first switching instruction transmission pin 412 to output the display mode switching startup instruction through the first switching instruction transmission pin 412. A switching process of switching the data sending mode corresponding to the second display mode to the data sending mode corresponding to the first display mode of the system circuit is started.

Since the level of the first switching instruction transmission pin 412 is pulled up, a level of the second switching instruction transmission pin 422 is also pulled up, and the time schedule controller 200 receives the display mode switching startup instruction output by the system circuit 300 through the second switching instruction transmission pin 422 and controls the counter circuit in the counting unit 500 to be in the zero clearing state, so that the counter circuit in the counting unit 500 does not execute the counting operation and holds the zero clearing operation to enter into the non-counting state. The time schedule controller 200 obtains pre-stored display data corresponding to a black picture from the flash. Since time is also consumed for switching the second display mode to the first display mode of the time schedule controller 200, before completing switching of the display mode, the time schedule controller 200 still inputs a control signal to the gate driving circuit with the second display mode, and thus the gate driving circuit is controlled to drive the gate lines row by row. The time schedule controller 200 outputs the obtained display data corresponding to the black picture (e.g., the 4K2K data) to the source driving circuit 120 with the second display mode. The source driving circuit 120 may receive the display data corresponding to the black picture and load a corresponding data voltage to the data lines according to the display data corresponding to the black picture so as to drive the display panel 100 to display the black picture. The system circuit 300 may send the display data to the time schedule controller 200 while switching the data sending modes. In the process of switching the display modes of the time schedule controller 200, the time schedule controller may receive the display data sent by the system circuit 300 and cache or not store the received display data. Since the counter circuit in the counting unit 500 is controlled to be in the zero clearing state, the counter circuit in the counting unit 500 does not count any received display data.

Since the switching speed of the data sending modes of the system circuit 300 is less than the switching speed of the display modes of the time schedule controller 200, after the time schedule controller 200 is switched from the second display mode to the first display mode, the system circuit 300 generally has not completed switching. The time schedule controller 200 inputs a control signal to the gate driving circuit with the first display mode to control the gate driving circuit to drive the gate lines row by row. The time schedule controller 200 outputs the obtained display data corresponding to the black picture (e.g., the 4K1K display data) to the source driving circuit 120 with the first display mode. The source driving circuit 120 may receive the display data corresponding to the black picture and load a corresponding data voltage to the data lines according to the display data corresponding to the black picture so as to drive the display panel 100 to display the black picture. The system circuit 300 may send the display data to the time schedule controller 200 while switching the data sending modes. After completing switching of the time schedule controller 200, the time schedule controller may receive the display data sent by the system circuit 300 and may cache or not store the received display data. Since the counting unit 500 is controlled to be in the zero clearing state, the counting unit 500 does not count any received display data.

After the system circuit 300 switches the data sending mode corresponding to the second display mode to the data sending mode corresponding to the first display mode, the data mode switching completing instruction in the digital signal form is output through the first IIC pin 411. The time schedule controller 200 receives the data mode switching completing instruction through the second IIC pin 421 and controls the counter circuit in the counting unit 500 to release the non-counting state and start to execute the function of the counting operation according to the data mode switching completing instruction. The system circuit 300 sends the display data by adopting the data sending mode corresponding to the second display mode, and the time schedule controller 200 receives the display data and controls the counter circuit in the counting unit 500 to count the corresponding sub-pixel rows in the display data to obtain the first number through counting. When determining that the counted first number is the same as the set number (such as 1097) corresponding to the first display mode, the counter circuit in the counting unit 500 may return to zero automatically and feed a pass instruction back to the time schedule controller 200. When receiving the pass instruction, the time schedule controller 200 may determine that the display data output by the system circuit 300 corresponds to the display data required by the first display mode, so that the time schedule controller 200 may drive the display panel 100 to display the corresponding picture according to the received display data (e.g., the 4K1K display data) on the basis of the first display mode.

When determining that the counted first number is different from the set number (such as 1097) corresponding to the first display mode, the counter circuit in the counting unit 500 cannot return to zero automatically and feeds an abnormality read-back instruction (e.g., 32448) back to the time schedule controller 200. When receiving the abnormality read-back instruction, the time schedule controller 200 may determine that the display data output by the system circuit 300 does not correspond to the display data required by the first display mode, and thus the time schedule controller 200 obtains display data of an early-warning picture from the flash and drives the display panel 100 to display an early-warning picture (e.g., circularly playing a red pure-color picture, a green pure-color picture and a blue pure-color picture) based on the first display mode. It should be noted that the early-warning picture is different from the first set picture and the second set picture, and thus corresponding prompt information may be obtained through the difference of displayed pictures.

During implementations, in embodiments of the present disclosure, the display apparatus may be: a mobile phone, a tablet computer, a television, a display, a laptop, a digital photo frame, a navigator and any product or component with a display function. Other essential components of the display apparatus shall be understood by those of ordinary skill in the art, and is omitted herein and also shall not become a restriction to the present disclosure.

In the driving method and the display apparatus provided by the embodiments of the present disclosure, the different display modes may be switched according to practical application scenarios of the display panel 100. For example, a high refresh frequency is required for a gaming display picture, however, the high refresh frequency will shorten charging time of the sub-pixels of the display panel 100, which results in insufficient charging of the sub-pixels. In the embodiments of the present disclosure, when a display mode with a low refresh frequency is switched to a display mode with a high refresh frequency, the charging rate of the sub-pixels may be increased while the high refresh frequency is achieved.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including, but not limited to, a disk memory, a CD-ROM, an optical memory and the like) containing computer available program codes.

The present disclosure is described with reference to the flow diagrams and/or block diagrams of the method, device (system), and computer program product according to the embodiments of the present disclosure. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A driving method of a display panel, comprising:

entering into, when receiving a display mode switching startup instruction, a non-counting state, driving the display panel to display a first set picture that is pre-stored, and switching a current display mode to a target display mode; and entering into a counting state when receiving a data mode switching completing instruction, wherein the data mode switching completing instruction indicates switching from a data sending mode corresponding to the current display mode to a data sending mode corresponding to the target display mode has been completed;

wherein the counting-state indicates display data counting being performed, and the non-counting state indicates display data counting not being performed;

wherein after entering into the counting state, the driving method further comprises:

receiving display data;

counting a first number of corresponding set targets in the display data; and driving the display panel to display a corresponding picture according to the received display data on the basis of the target display mode after determining that the first number is same as a set number corresponding to the target display mode;

wherein the display panel comprises a first display mode; wherein the first display mode comprises:

in a first display frame of two adjacent display frames:

gate lines in the display panel are driven row by row, and during driving of gate lines connected with display sub-pixels at a next odd row after driving of gate lines connected with display sub-pixels at a previous odd row, a data voltage corresponding to display data is input to data lines corresponding to the display sub-pixels at the next odd row; and in a second display frame of the two adjacent display frames:

the gate lines in the display panel are driven row by row, and during driving of gate lines connected with display sub-pixels at a next even row after driving of gate lines connected with display sub-pixels at a previous even row, a data voltage corresponding to the display data is input to data lines corresponding to the display sub-pixels at the next even row;

wherein the display panel comprises a second display mode; wherein the second display mode comprises:

in each display frame:

the gate lines are driven row by row, and during driving of a next row of gate lines after driving of a previous row of gate lines, a data voltage corresponding to the display data is input to data lines corresponding to sub-pixels connected with the next row of gate lines;

wherein the display panel comprises a third display mode; wherein the third display mode comprises:

in each display frame:

at least two adjacent rows of gate lines are grouped as one of gate line groups, display data corresponding to one row of sub-pixels in each gate line group is received, according to the received display data, gate lines in a same gate line group are driven at same time, and the gate line groups are driven one by one, and during driving of gate lines in a next gate line group after driving of gate lines in a previous gate line group, a data voltage corresponding to the display data is input to data lines corresponding to sub-pixels connected with the gate lines of the next gate line group;

wherein:

the current display mode is one of the first display mode, the second display mode and the third display mode; and the target display mode is one of the first display mode, the second display mode and the third display mode other than the current display mode;

wherein the set targets comprise sub-pixel rows of the display panel;

the display panel comprises display sub-pixel rows and dummy sub-pixel rows;

when the target display mode is the first display mode, the set number comprises a total number of all the dummy sub-pixel rows and a half of a total number of the display sub-pixel rows; and when the target display mode is the second display mode, the set number comprises the total number of all the dummy sub-pixel rows and the total number of all the display sub-pixel rows.

2. The driving method of the display panel according to claim 1, wherein after counting the first number of the corresponding set targets in the display data and before driving the display panel to display the corresponding picture according to the received display data on the basis of the target display mode after determining that the first number is the same as the set number corresponding to the target display mode, the driving method further comprises:

driving the display panel to display a second set picture in at least one display frame based on the target display mode when determining that the first number is the same as the set number.

3. The driving method of the display panel according to claim 2, wherein a quantity of the display frames for displaying the second set picture is determined by adopting a following formula;

$SM=TM/AM$; wherein

SM represents the quantity of the display frames for displaying the second set picture, TM represents set time, and AM represents a reciprocal of a refresh frequency corresponding to the target display mode.

4. The driving method of the display panel according to claim 2, wherein at least one of the first set picture or the second set picture comprises at least one of a pure-color picture or a gray-scale picture.

5. The driving method of the display panel according to claim 1, wherein the non-counting state comprises one of a zero clearing state, a disabled state and a power-off state.

6. The driving method of the display panel according to claim 1, wherein the set targets comprise the gate line groups of the display panel; and when the target display mode is the third display mode, the set number comprises a total number of the gate line groups.

7. A display apparatus, comprising:

a display panel;

a time schedule controller, configured to:

enter into, when receiving a display mode switching startup instruction, a non-counting state, drive the display panel to display a first set picture that is pre-stored, and switch a current display mode to a target display mode; and enter into a counting state when receiving a data mode switching completing instruction, wherein the data mode switching completing instruction indicates switching from a data sending mode corresponding to the current display mode to a data sending mode corresponding to the target display mode has been completed;

wherein the counting-state indicates display data counting being performed, and the non-counting state indicates display data counting not being performed;

a system circuit, configured to:

send, when determining to switch different display modes, the display mode switching startup instruction to the time schedule controller, and switch the data sending mode corresponding to the current display mode to the data sending mode corresponding to the target display mode; and send the data mode switching completing instruction to the time schedule controller after completing switching from the data sending mode corresponding to the current display mode to the data sending mode corresponding to the target display mode;

and a counting unit; wherein the counting unit is configured to count a first number of corresponding set targets in display data, and output a counting pass instruction when determining that the first number is same as a set number corresponding to the target display mode; and the time schedule controller is further configured to control the counting unit to enter into the non-counting state when receiving the display mode switching startup instruction; and control the counting unit to enter into the counting state when receiving the data mode switching completing instruction;

wherein the display panel comprises a first display mode; wherein the first display mode comprises:

in a first display frame of two adjacent display frames:

gate lines in the display panel are driven row by row, and during driving of gate lines connected with display sub-pixels at a next odd row after driving of gate lines connected with display sub-pixels at a previous odd row, a data voltage corresponding to display data is input to data lines corresponding to the display sub-pixels at the next odd row; and in a second display frame of the two adjacent display frames:

the gate lines in the display panel are driven row by row, and during driving of gate lines connected with display sub-pixels at a next even row after driving of gate lines connected with display sub-pixels at a previous even row, a data voltage corresponding to the display data is input to data lines corresponding to the display sub-pixels at the next even row;

wherein the display panel comprises a second display mode; wherein the second display mode comprises:

in each display frame:

the gate lines are driven row by row, and during driving of a next row of gate lines after driving of a previous row of gate lines, a data voltage corresponding to the display data is input to data lines corresponding to sub-pixels connected with the next row of gate lines;

wherein the display panel comprises a third display mode; wherein the third display mode comprises:

in each display frame:

at least two adjacent rows of gate lines are grouped as one of gate line groups, display data corresponding to one row of sub-pixels in each gate line group is received, according to the received display data, gate lines in a same gate line group are driven at same time, and the gate line groups are driven one by one, and during driving of gate lines in a next gate line group after driving of gate lines in a previous gate line group, a data voltage corresponding to the display data is input to data lines corresponding to sub-pixels connected with the gate lines of the next gate line group;

wherein:

the current display mode is one of the first display mode, the second display mode and the third display mode; and the target display mode is one of the first display mode, the second display mode and the third display mode other than the current display mode;

wherein the set targets comprise sub-pixel rows of the display panel;

the display panel comprises display sub-pixel rows and dummy sub-pixel rows;

when the target display mode is the first display mode, the set number comprises a total number of all the dummy sub-pixel rows and a half of a total number of the display sub-pixel rows; and when the target display mode is the second display mode, the set number comprises the total number of all the dummy sub-pixel rows and the total number of all the display sub-pixel rows.

8. The display apparatus according to claim 7, wherein the counting unit is integrated in the time schedule controller.

* * * * *